(12) United States Patent
Won

(10) Patent No.: US 11,704,825 B2
(45) Date of Patent: Jul. 18, 2023

(54) METHOD FOR ACQUIRING DISTANCE FROM MOVING BODY TO AT LEAST ONE OBJECT LOCATED IN ANY DIRECTION OF MOVING BODY BY UTILIZING CAMERA-VIEW DEPTH MAP AND IMAGE PROCESSING DEVICE USING THE SAME

(71) Applicant: MULTIPLEYE CO., LTD., Seoul (KR)

(72) Inventor: Chang Hee Won, Seoul (KR)

(73) Assignee: MULTIPLEYE CO., LTD., Seoul (KR)

( * ) Notice: Subject to any disclaimer, the term of this patent is extended or adjusted under 35 U.S.C. 154(b) by 0 days.

(21) Appl. No.: 17/865,855

(22) Filed: Jul. 15, 2022

(65) Prior Publication Data

US 2023/0086983 A1 Mar. 23, 2023

(30) Foreign Application Priority Data

Sep. 23, 2021 (KR) .......................... 10-2021-0126023

(51) Int. Cl.
*G06T 7/593* (2017.01)
*H04N 13/271* (2018.01)
(Continued)

(52) U.S. Cl.
CPC ................ *G06T 7/593* (2017.01); *G06T 7/10* (2017.01); *G06T 7/13* (2017.01); *G06T 7/60* (2013.01);
(Continued)

(58) Field of Classification Search
CPC .. G06T 7/593; G06T 7/10; G06T 7/13; G06T 7/60; G06T 7/70; G06T 2207/10012;
(Continued)

(56) References Cited

U.S. PATENT DOCUMENTS

2018/0005398 A1\* 1/2018 Kim ..................... G02B 5/3083
2018/0293454 A1\* 10/2018 Xu ............................. G06T 7/60
(Continued)

FOREIGN PATENT DOCUMENTS

KR 10-2017-0017700 A 2/2017
KR 10-2021-0049581 A 5/2021
WO WO-2019211459 A1 \* 11/2019 ............. G06T 7/593

OTHER PUBLICATIONS

Korean Office Action dated Dec. 13, 2021 as received in application No. 10-2021-0126023.
(Continued)

*Primary Examiner* — Masum Billah
(74) *Attorney, Agent, or Firm* — Maschoff Brennan

(57) ABSTRACT

A method for acquiring a distance from a moving body to an object located in any direction of the moving body includes steps of: an image processing device (a) instructing a sweep network to project pixels of images, generated by cameras covering all directions of the moving body, onto main virtual geometries and apply 3D concatenation operation thereon to generate an initial 4D cost volume, (b) generating a final main 3D cost volume therefrom through a cost volume computation network, and (c) generating sub inverse distance indices corresponding to inverse values of sub separation distances between a sub reference point and sub virtual geometries, and main inverse distance indices corresponding to inverse values of main separation distances between a main reference point and the main virtual geometries, by using a sub cost volume and the final main 3D cost volume, to thereby acquire the distance to the object.

20 Claims, 18 Drawing Sheets

(51) Int. Cl.
  *H04N 13/156* (2018.01)
  *G06T 7/70* (2017.01)
  *G06T 7/10* (2017.01)
  *G06T 7/13* (2017.01)
  *G06T 7/60* (2017.01)
  *H04N 23/90* (2023.01)
  *H04N 13/282* (2018.01)
  *H04N 13/00* (2018.01)

(52) U.S. Cl.
  CPC ............. *G06T 7/70* (2017.01); *H04N 13/156* (2018.05); *H04N 13/271* (2018.05); *H04N 23/90* (2023.01); *G06T 2207/10012* (2013.01); *G06T 2207/20021* (2013.01); *G06T 2207/20081* (2013.01); *G06T 2207/20084* (2013.01); *G06T 2207/30244* (2013.01); *G06T 2207/30252* (2013.01); *H04N 13/282* (2018.05); *H04N 2013/0081* (2013.01); *H04N 2013/0092* (2013.01)

(58) Field of Classification Search
  CPC . G06T 2207/20021; G06T 2207/20084; G06T 2207/10028; G06T 2207/10024; H04N 5/247; H04N 13/156; H04N 13/271
  USPC .......................................................... 348/41
  See application file for complete search history.

(56) References Cited

U.S. PATENT DOCUMENTS

| | | | |
|---|---|---|---|
| 2018/0322611 A1* | 11/2018 | Bang | G06T 3/0037 |
| 2019/0138029 A1* | 5/2019 | Ryll | B64C 39/024 |
| 2019/0295282 A1* | 9/2019 | Smolyanskiy | G01S 17/88 |
| 2020/0273192 A1* | 8/2020 | Cheng | G06T 7/593 |
| 2021/0065393 A1* | 3/2021 | Jeon | G06V 10/751 |
| 2021/0329211 A1* | 10/2021 | Coombs | H04N 13/128 |

OTHER PUBLICATIONS

Won et al., "OmniMVS: End-to-End Learning for Omnidirectional Stereo Matching" Department of Computer Science, Hanyang University, Seoul, Korea. Oct. 27, 2019.

Heng et al., "Project AutoVision: Localization and 3D Scene Perception for an Autonomous Vehicle with a Multi-Camera System" Sep. 14, 2018.

Korean Decision to Grant dated Feb. 3, 2022 as received in application No. 10-2021-0126023.

\* cited by examiner

Algorithm 1: multi-view P3P RANSAC algorithm

Data: 2D feature locations and 3D landmark correspondences in all views, $\{\{(\bar{x}_{ij}, {}^W X_{ij})\}_{ij}\}_j$

Result: Rigid body transformation ${}^b_w \theta^*$

1 while $iter < iter_{max}$ do
2      Select a camera $j'$ using PPS sampling.
3      Randomly sample 3 pairs in the selected camera.
4      Get camera pose candidates $\{{}^{j'}_w \theta_k\}$ by P3P.
5      Compute the body pose candidates $\{{}^b_w \theta_k\}$.
6      for each body pose candidate ${}^b_w \theta_k$ do
7          for each camera $j$ do
8              Compute the camera pose ${}^j_w \theta_k$.
9              Add reprojection error of all inliers in $j$:
10             $C_k \mathrel{+}= \sum_{ij} \max(0, \tau_r - \| \bar{x}_{ij} - \pi_0({}^j_w \theta_k * {}^W X_{ij}) \|)$
11          end
12          if $C_k$ is largest then
13              ${}^b_w \theta^* \leftarrow {}^b_w \theta_k$.
14              Update $iter_{max}$ with the new inlier ratio.
15          end
16      end
17 end

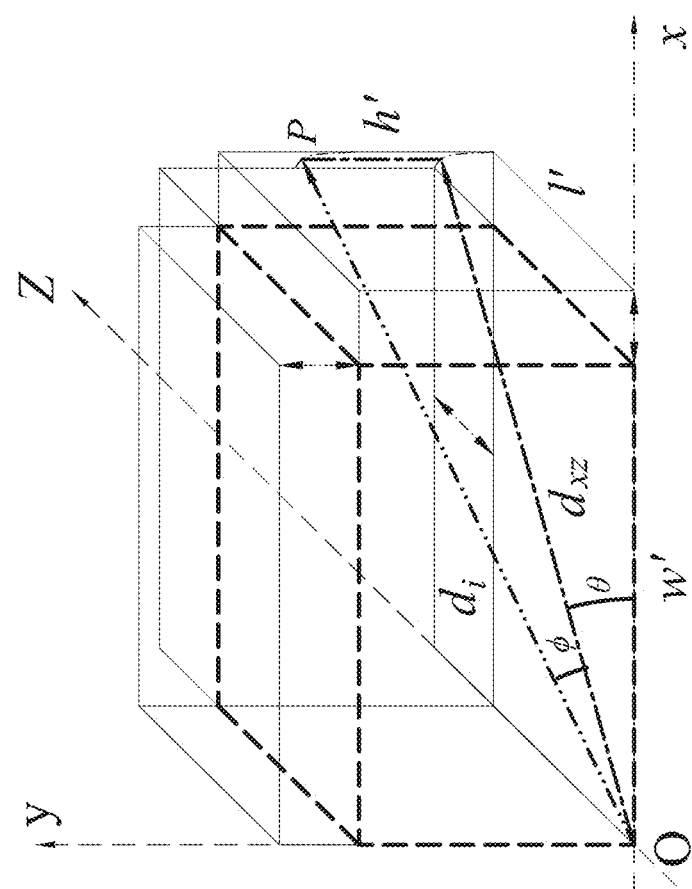

METHOD FOR ACQUIRING DISTANCE FROM MOVING BODY TO AT LEAST ONE OBJECT LOCATED IN ANY DIRECTION OF MOVING BODY BY UTILIZING CAMERA-VIEW DEPTH MAP AND IMAGE PROCESSING DEVICE USING THE SAME

CROSS REFERENCE OF RELATED APPLICATION

This present application claims the benefit of the earlier filing date of Korean non-provisional patent application No. 10-2021-0126023, filed Sep. 23, 2021, the entire contents of which being incorporated herein by reference.

FIELD OF THE DISCLOSURE

The present disclosure relates to a method for acquiring a distance from a moving body to at least one object located in any direction of the moving body and an image processing device using the same; and more particularly, to the method for acquiring the distance from the moving body to at least one object located in any direction of the moving body by projecting multiple images obtained from multiple cameras onto multiple virtual geometries, and the image processing device using the same.

BACKGROUND OF THE DISCLOSURE

In order for a moving body, such as an autonomous vehicle, to navigate smoothly, distance information on one or more objects located around the moving body is required.

Conventionally, LIDAR sensors, RADAR sensors and cameras, etc. have been used as means to obtain the distance information on the objects located around the moving body.

However, methods requiring the use of the LIDAR sensors or the RADAR sensors yield outputs of low resolutions despite their high cost and large power consumption.

Therefore, in order to overcome the above-described problems, a plurality of cameras have been utilized to obtain the distance information. For example, conventionally, a method of obtaining the distance information based on a reference point that is set by referring to positions of the cameras is used.

However, there is a problem associated with the conventional method of obtaining the distance information and this is described in detail by referring to FIG. 1. In a given situation where an object A (e.g., a person) 210 and an object B (e.g., a specific location on a wall) 220 are respectively located at distances of 10 m and 20 m from the reference point 110 set by referring to positions of the plurality of cameras, the specific location B 220 on a wall that is not visible from the reference point 110 (due to the object A) is able to be observed from a position 120-1 of a first camera and a position 120-2 of a second camera.

In this case, a conventional image processing device determines both the distance information from the reference point to the object A and the distance information from the reference point to the object B to be positive true responses.

Accordingly, even though the conventional image processing device is supposed to output the distance information of the object A since the object A is located nearer to the reference point than the object B, the conventional image processing device may instead inaccurately output (i) distance information to a random point located between the object A and the object B or (ii) distance information of the object B as a result of recognizing the distance information of the relatively smaller object A as noise.

Therefore, an enhanced method for solving the aforementioned problem is required.

SUMMARY OF THE DISCLOSURE

It is an object of the present disclosure to solve all the aforementioned problems.

It is another object of the present disclosure to acquire a distance of a moving body to at least one object located in any direction of the moving body.

It is still another object of the present disclosure to generate a sub cost volume for each of cameras by using a main cost volume obtained from a plurality of images captured by the cameras and to acquire the distance to at least one object from the moving body by using the sub cost volume for each of the cameras.

It still yet another object of the present disclosure to improve accuracy of segmentation results by using distance information on the object.

In accordance with one aspect of the present disclosure, there is provided a method for acquiring a distance from a moving body to at least one object located in any direction of the moving body, including steps of: (a) on condition that a 1-st camera to a p-th camera, capable of covering all directions of the moving body by using each of their respective Field of Views (FOVs), have been arranged to be apart from one another on the moving body, an image processing device, in response to acquiring a 1-st image to a p-th image generated by the 1-st camera to the p-th camera, inputting the 1-st image to the p-th image to a sweep network and instructing the sweep network to (i) project a plurality of pixels on each of the 1-st image to the p-th image onto N main virtual geometries, respectively formed on a basis of a predetermined main reference point or a predetermined main reference virtual geometry, to thereby generate a plurality of main stereoscopic images, and (ii) apply three-dimensional (3D) concatenation operation to the plurality of the main stereoscopic images and thus generate an initial four-dimensional (4D) cost volume; (b) the image processing device inputting the initial 4D cost volume to a cost volume computation network, including a plurality of 3D convolution layers and their corresponding 3D deconvolution layers, to thereby generate a final main 3D cost volume; and (c) the image processing device performing (i) processes of (i-1) projecting a plurality of pixels on a k-th image, generated from a k-th camera among the 1-st camera to the p-th camera, onto M k-th sub virtual geometries, respectively formed on a basis of a predetermined k-th sub reference point, to thereby generate a plurality of k-th sub stereoscopic images, (i-2) converting each of positions of each of a plurality of pixels on the plurality of the k-th sub stereoscopic images on the basis of the predetermined main reference point, to thereby acquire k-th 3D pixel coordinates, (i-3) applying the k-th 3D pixel coordinates to the final main 3D cost volume to thereby acquire a k-th sub cost factor, (i-4) generating a k-th sub cost volume by using the k-th sub cost factor, (i-5) generating one or more k-th sub inverse distance indices corresponding to one or more k-th sub inverse distances by using the k-th sub cost volume, wherein each of the k-th sub inverse distances represents each of inverse values of each of a (k_1)-st sub separation distance to a (k_M)-th sub separation distance, each of the (k_1)-st sub separation distance to the (k_M)-th sub separation distance meaning each of distances between the predetermined k-th sub reference point of the k-th camera and the M k-th sub virtual geometries, and (i-6) acquiring at least one sub separation distance among the (k_1)-st sub separation distance to the (k_M)-th sub separation distance by referring to the k-th sub inverse distances extracted from the k-th sub inverse distance indices, and (ii) processes of (ii-1) generating one or more main inverse distance indices corresponding to one or more main inverse distances by using the final main 3D cost volume, wherein each of the main inverse distances represents each of inverse values of each of N main separation distances, each of the N main separation distances meaning each of distances between the predetermined main reference point and the N main virtual geometries or between the predetermined main reference virtual geometry and the N main virtual geometries, (ii-2) acquiring at least one main separation distance among the N main separation distances by referring to the main inverse distances extracted from the main inverse distance indices, and thus (ii-3) acquiring a distance from the moving body to at least one object located in any direction of the moving body by referring to the at least one sub separation distance among the (k_1)-st sub separation distance to the (k_M)-th sub separation distance and the at least one main separation distance among the N main separation distances.

As one example, the N main virtual geometries are centered on a first main reference point which is the predetermined main reference point set by referring to a 1-st position of the 1-st camera to a p-th position of the p-th camera, and wherein the N main virtual geometries correspond to N main virtual spheres whose radii are the N main separation distances comprised of a (1_1)-st main separation distance to a (1_N)-th main separation distance, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the step of (c), the image processing device performs processes of (i) (i-1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i-2) acquiring the at least one sub separation distance among the (k_1)-st sub separation distance to the (k_M)-th sub separation distance by referring to the k-th sub inverse depths extracted from the k-th sub inverse depth indices, and (ii) (ii-1) generating one or more main inverse depth indices corresponding to one or more main inverse depths by using the final main 3D cost volume, wherein each of the main inverse depths represents each of inverse values of the (1_1)-st main separation distance to the (1_N)-th main separation distance, each of the (1_1)-st main separation distance to the (1_N)-th main separation distance meaning each of distances between the first main reference point and the N main virtual spheres, (ii-2) acquiring the at least one main separation distance among the (1_1)-st main separation distance to the (1_N)-th main separation distance by referring to the main inverse depths extracted from the main inverse depth indices, and thus (ii-3) acquiring the distance from the moving body to at least one object located in any direction of the moving body by referring to the at least one main separation distance among the (1_1)-st main separation distance to the (1_N)-th main separation distance and the at least one sub separation distance among the (k_1)-st sub separation distance to the (k_M)-th sub separation distance.

As another example, the N main virtual geometries correspond to N main virtual rounded cuboids each of which includes a main extended plane set, having three main extended planes, and main curved surfaces interconnecting at least two of the three main extended planes, wherein the three main extended planes are respectively formed at a (2_1)-st main separation distance to a (2_N)-th main separation distance from each of three main reference planes of the main reference virtual geometry that is centered on a second main reference point set as the predetermined main reference point by referring to a 1-st position of the 1-st camera to a p-th position of the p-th camera, wherein the three main reference planes are orthogonal to one another, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the step of (c), the image processing device performs processes of (i) (i-1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i-2) acquiring the at least one sub separation distance among the (k_1)-st sub separation distance to the (k_M)-th sub separation distance by referring to the k-th sub inverse depths extracted from the k-th sub inverse depth indices, and (ii) (ii-1) generating one or more main inverse radius indices corresponding to one or more main inverse radii by using the final main 3D cost volume, wherein each of the main inverse radii represents each of inverse values of the (2_1)-st main separation distance to the (2_N)-th main separation distance of the N main virtual rounded cuboids, (ii-2) acquiring the at least one main separation distance among the (2_1)-st main separation distance to the (2_N)-th main separation distance by referring to the main inverse radii extracted from the main inverse radius indices, and thus (ii-3) acquiring the distance from the moving body to at least one object located in any direction of the moving body by referring to the at least one main separation distance among the (2_1)-st main separation distance to the (2_N)-th main separation distance and the at least one sub separation distance among the (k_1)-st sub separation distance to the (k_M)-th sub separation distance.

As another example, at the step of (a), the image processing device instructs the sweep network to (i) compute a specific distance $d_i$ equivalent to a distance between the second main reference point of the main reference virtual geometry and a specific point on an i-th main virtual rounded cuboid, wherein i is an integer bigger than or equal to 1 and smaller than or equal to N, and (ii) project the plurality of pixels on each of the 1-st image to the p-th image onto the i-th main virtual rounded cuboid by referring to the specific distance $d_i$, wherein the specific distance $d_i$ is determined by an equation:

$$d_i = f(r_i, \theta, \Psi; w, h, l)$$

wherein (i) $r_i$ is a separation distance between the main reference virtual geometry and the i-th main virtual rounded cuboid, (ii) θ and Ψ are respectively an azimuth angle and a polar angle of a virtual line segment connecting the specific point and the second main reference point of the main reference virtual geometry in a spherical coordinate system having the second main reference point as an origin thereof, and (iii) w, h and l are respectively lengths of a first edge, a second edge and a third edge of the main reference virtual geometry which are orthogonal to one another.

As another example, the image processing device further performs a step of: (d) the image processing device generating at least one sub distance loss by referring to the k-th sub inverse distance indices and their corresponding k-th ground truth sub inverse distance indices and thus training at least part of the cost volume computation network and the sweep network by using the sub distance loss through an end-to-end way.

As another example, the image processing device additionally generates at least one main distance loss by referring to the main inverse distance indices and their corresponding ground truth main inverse distance indices and thus trains at least part of the cost volume computation network and the sweep network by additionally using the main distance loss through the end-to-end way.

As another example, at the step of (a), in response to receiving the 1-st image to the p-th image from the 1-st camera to the p-th camera, the image processing device generates a 1-st feature map to a p-th feature map corresponding to the 1-st image to the p-th image by inputting the 1-st image to the p-th image to a plurality of 2D (two-dimensional) convolution layers, and thus generates the main stereoscopic images from the 1-st feature map to the p-th feature map.

As another example, the image processing device further performs a step of: (e) in response to acquiring a k-th feature map corresponding to the k-th image from a specific 2D convolution layer among the plurality of 2D convolution layers, the image processing device inputting the k-th feature map and the k-th sub cost volume to a segmentation network including 2D deconvolution layers, to thereby instruct the segmentation network to generate a k-th estimated segmentation result corresponding to the k-th image through the 2D deconvolution layers.

As another example, the image processing device further performs a step of: (f) the image processing device (i) generating at least one sub distance loss by referring to the k-th sub inverse distance indices and their corresponding k-th ground truth sub inverse distance indices and thus training at least part of the cost volume computation network and the sweep network by using the sub distance loss through an end-to-end way, and (ii) generating at least one segmentation loss by referring to the k-th estimated segmentation result and its corresponding k-th ground truth segmentation result and thus training the segmentation network by using the segmentation loss through the end-to-end way.

As another example, at the step of (f), the image processing device additionally generates at least one main distance loss by referring to the main inverse distance indices and their corresponding ground truth main inverse distance indices and thus trains at least part of the cost volume computation network and the sweep network by additionally using the main distance loss through the end-to-end way.

In accordance with another aspect of the present disclosure, there is provided an image processing device for acquiring a distance from a moving body to at least one object located in any direction of the moving body, including: at least one memory that stores instructions; and at least one processor configured to execute the instructions to perform or support another device to perform: (I) on condition that a 1-st camera to a p-th camera, capable of covering all directions of the moving body by using each of their respective Field of Views (FOVs), have been arranged to be apart from one another on the moving body, in response to acquiring a 1-st image to a p-th image generated by the 1-st camera to the p-th camera, a process of inputting the 1-st image to the p-th image to a sweep network and instructing the sweep network to (i) project a plurality of pixels on each of the 1-st image to the p-th image onto N main virtual geometries, respectively formed on a basis of a predetermined main reference point or a predetermined main reference virtual geometry, to thereby generate a plurality of main stereoscopic images, and (ii) apply three-dimensional (3D) concatenation operation to the plurality of the main stereoscopic images and thus generate an initial four-dimensional (4D) cost volume; (II) a process of inputting the initial 4D cost volume to a cost volume computation network, including a plurality of 3D convolution layers and their corresponding 3D deconvolution layers, to thereby generate a final main 3D cost volume; and (III) (i) processes of (i–1) projecting a plurality of pixels on a k-th image, generated from a k-th camera among the 1-st camera to the p-th camera, onto M k-th sub virtual geometries, respectively formed on a basis of a predetermined k-th sub reference point, to thereby generate a plurality of k-th sub stereoscopic images, (i–2) converting each of positions of each of a plurality of pixels on the plurality of the k-th sub stereoscopic images on the basis of the predetermined main reference point, to thereby acquire k-th 3D pixel coordinates, (i–3) applying the k-th 3D pixel coordinates to the final main 3D cost volume to thereby acquire a k-th sub cost factor, (i–4) generating a k-th sub cost volume by using the k-th sub cost factor, (i–5) generating one or more k-th sub inverse distance indices corresponding to one or more k-th sub inverse distances by using the k-th sub cost volume, wherein each of the k-th sub inverse distances represents each of inverse values of each of a (k_1)-st sub separation distance to a (k_M)-th sub separation distance, each of the (k_1)-st sub separation distance to the (k_M)-th sub separation distance meaning each of distances between the predetermined k-th sub reference point of the k-th camera and the M k-th sub virtual geometries, and (i–6) acquiring at least one sub separation distance among the (k_1)-st sub separation distance to the (k_M)-th sub separation distance by referring to the k-th sub inverse distances extracted from the k-th sub inverse distance indices, and (ii) processes of (ii–1) generating one or more main inverse distance indices corresponding to one or more main inverse distances by using the final main 3D cost volume, wherein each of the main inverse distances represents each of inverse values of each of N main separation distances, each of the N main separation distances meaning each of distances between the predetermined main reference point and the N main virtual geometries or between the predetermined main reference virtual geometry and the N main virtual geometries, (ii–2) acquiring at least one main separation distance among the N main separation distances by referring to the main inverse distances extracted from the main inverse distance indices, and thus (ii–3) acquiring a distance from the moving body to at least one object located in any direction of the moving body by referring to the at least one sub separation distance among the (k_1)-st sub separation distance to the (k_M)-th sub separation distance and the at least one main separation distance among the N main separation distances.

As one example, the N main virtual geometries are centered on a first main reference point which is the predetermined main reference point set by referring to a 1-st position of the 1-st camera to a p-th position of the p-th camera, and wherein the N main virtual geometries correspond to N main virtual spheres whose radii are the N main separation distances comprised of a (1_1)-st main separation distance to a (1_N)-th main separation distance, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the processes of (III), the processor performs processes of (i) (i–1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i–2) acquiring the at least one sub separation distance among the (k_1)-st sub separation distance to the (k_M)-th sub separation distance by referring to the k-th sub inverse depths extracted from the k-th sub inverse depth indices, and (ii) (ii–1) generating one or more main inverse depth indices corresponding to one or more main inverse depths by using the final main 3D cost volume, wherein each of the main inverse depths represents each of inverse values of the (1_1)-st main separation distance to the (1_N)-th main separation distance, each of the (1_1)-st main separation distance to the (1_N)-th main separation distance meaning each of distances between the first main reference point and the N main virtual spheres, (ii–2) acquiring the at least one main separation distance among the (1_1)-st main separation distance to the (1_N)-th main separation distance by referring to the main inverse depths extracted from the main inverse depth indices, and thus (ii–3) acquiring the distance from the moving body to at least one object located in any direction of the moving body by referring to the at least one main separation distance among the (1_1)-st main separation distance to the (1_N)-th main separation distance and the at least one sub separation distance among the (k_1)-st sub separation distance to the (k_M)-th sub separation distance.

As another example, the N main virtual geometries correspond to N main virtual rounded cuboids each of which includes a main extended plane set, having three main extended planes, and main curved surfaces interconnecting at least two of the three main extended planes, wherein the three main extended planes are respectively formed at a (2_1)-st main separation distance to a (2_N)-th main separation distance from each of three main reference planes of the main reference virtual geometry that is centered on a second main reference point set as the predetermined main reference point by referring to a 1-st position of the 1-st camera to a p-th position of the p-th camera, wherein the three main reference planes are orthogonal to one another, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the processes of (III), the processor performs processes of (i) (i–1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i–2) acquiring the at least one sub separation distance among the (k_1)-st sub separation distance to the (k_M)-th sub separation distance by referring to the k-th sub inverse depths extracted from the k-th sub inverse depth indices, and (ii) (ii–1) generating one or more main inverse radius indices corresponding to one or more main inverse radii by using the final main 3D cost volume, wherein each of the main inverse radii represents each of inverse values of the (2_1)-st main separation distance to the (2_N)-th main separation distance of the N main virtual rounded cuboids, (ii–2) acquiring the at least one main separation distance among the (2_1)-st main separation distance to the (2_N)-th main separation distance by referring to the main inverse radii extracted from the main inverse radius indices, and thus (ii–3) acquiring the distance from the moving body to at least one object located in any direction of the moving body by referring to the at least one main separation distance among the (2_1)-st main separation distance to the (2_N)-th main separation distance and the at least one sub separation distance among the (k_1)-st sub separation distance to the (k_M)-th sub separation distance.

As another example, at the process of (I), the processor instructs the sweep network to (i) compute a specific distance $d_i$ equivalent to a distance between the second main reference point of the main reference virtual geometry and a specific point on an i-th main virtual rounded cuboid, wherein i is an integer bigger than or equal to 1 and smaller than or equal to N, and (ii) project the plurality of pixels on each of the 1-st image to the p-th image onto the i-th main virtual rounded cuboid by referring to the specific distance $d_i$, wherein the specific distance $d_i$ is determined by an equation:

$$d_i = f(r_i, \theta, \Psi; w, h, l)$$

wherein (i) $r_i$ is a separation distance between the main reference virtual geometry and the i-th main virtual rounded cuboid, (ii) $\theta$ and $\Psi$ are respectively an azimuth angle and a polar angle of a virtual line segment connecting the specific point and the second main reference point of the main reference virtual geometry in a spherical coordinate system having the second main reference point as an origin thereof, and (iii) w, h and l are respectively lengths of a first edge, a second edge and a third edge of the main reference virtual geometry which are orthogonal to one another.

As another example, the processor further performs a process of: (IV) generating at least one sub distance loss by referring to the k-th sub inverse distance indices and their corresponding k-th ground truth sub inverse distance indices and thus training at least part of the cost volume computation network and the sweep network by using the sub distance loss through an end-to-end way.

As another example, the processor additionally generates at least one main distance loss by referring to the main inverse distance indices and their corresponding ground truth main inverse distance indices and thus trains at least part of the cost volume computation network and the sweep network by additionally using the main distance loss through the end-to-end way.

As another example, at the process of (I), in response to receiving the 1-st image to the p-th image from the 1-st camera to the p-th camera, the processor generates a 1-st feature map to a p-th feature map corresponding to the 1-st image to the p-th image by inputting the 1-st image to the p-th image to a plurality of 2D (two-dimensional) convolution layers, and thus generates the main stereoscopic images from the 1-st feature map to the p-th feature map.

As another example, the processor further performs a process of: (V) in response to acquiring a k-th feature map corresponding to the k-th image from a specific 2D convolution layer among the plurality of 2D convolution layers, inputting the k-th feature map and the k-th sub cost volume to a segmentation network including 2D deconvolution layers, to thereby instruct the segmentation network to generate a k-th estimated segmentation result corresponding to the k-th image through the 2D deconvolution layers.

As another example, the processor further performs a process of: (VI) (i) generating at least one sub distance loss by referring to the k-th sub inverse distance indices and their corresponding k-th ground truth sub inverse distance indices and thus training at least part of the cost volume computation network and the sweep network by using the sub distance loss through an end-to-end way, and (ii) generating at least one segmentation loss by referring to the k-th estimated segmentation result and its corresponding k-th ground truth segmentation result and thus training the segmentation network by using the segmentation loss through the end-to-end way.

As another example, at the process of (VI), the processor additionally generates at least one main distance loss by referring to the main inverse distance indices and their corresponding ground truth main inverse distance indices and thus trains at least part of the cost volume computation network and the sweep network by additionally using the main distance loss through the end-to-end way.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 8 is a drawing schematically illustrating a camera posture estimation algorithm in accordance with one example embodiment of the present disclosure.

FIGS. 10A to 10G are drawings schematically illustrating a method for computing a specific distance $d_i$ equivalent to a distance between a second main reference point of the main reference virtual geometry and a specific point on the main virtual rounded cuboid in accordance with one example embodiment of the present disclosure.

DETAILED DESCRIPTION OF THE PREFERRED EMBODIMENTS

Figure 1:
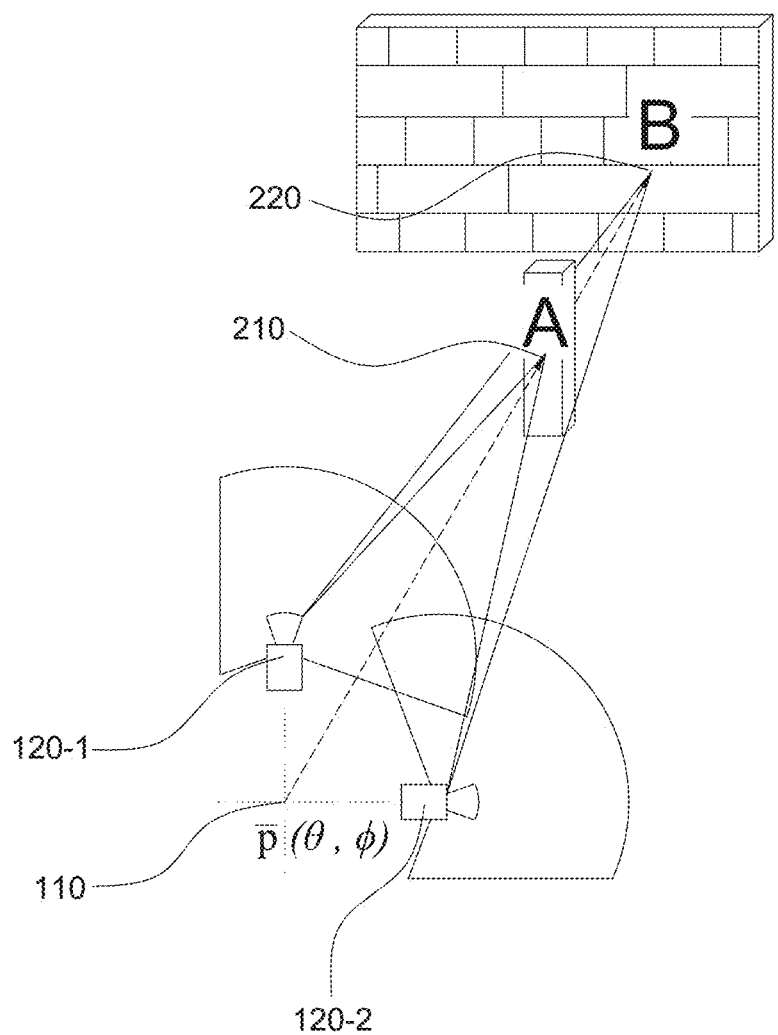
FIG. 1 is a drawing schematically illustrating an example of a conventional method of acquiring a distance of a moving body to at least one object located in any direction of the moving body to explain a problem of the conventional method.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

Figure 2:
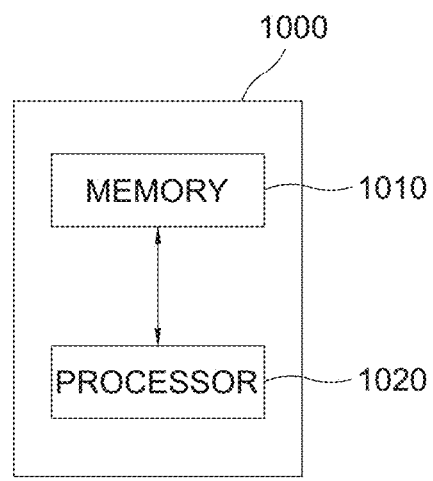
FIG. 2 is a drawing schematically illustrating an image processing device for acquiring the distance of the moving body to at least one object located in any direction of the moving body in accordance with one example embodiment of the present disclosure.

FIG. 2 is a drawing schematically illustrating an image processing device 1000 for acquiring a distance of a moving body to at least one object located in any direction of the moving body in accordance with one example embodiment of the present disclosure.

By referring to FIG. 2, the image processing device 1000 may include a memory 1010 for storing instructions to acquire the distance to at least one object from the moving body, and a processor 1020 for acquiring the distance to at least one object from the moving body according to the instructions in the memory 1010. Herein, the image processing device may include devices such as a PC (Personal Computer), a mobile computer, etc.

Specifically, the image processing device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of acquiring the distance of at least one object from the moving body by using the image processing device 1000 configured as explained above is described below.

First, on condition that a 1-st camera to a p-th camera have been arranged to be apart from one another on the moving body, a 1-st image to a p-th image captured by the 1-st camera to the p-th camera may be acquired.

Herein, the 1-st image to the p-th image generated by the 1-st camera to the p-th camera may be transferred directly to the image processing device 1000 or may be transferred to the image processing device 1000 via a separate device such as a relay device. In addition, the 1-st image to the p-th image may be transmitted to the image processing device 1000 through a wireless communication method or a wired communication method.

Also, the 1-st camera to the p-th camera may have wide field of views (FoVs) and may be capable of covering all directions of the moving body by using each of their respective FoVs.

For example, the 1-st camera to the p-th camera may be arranged in diagonal directions with respect to a moving direction of the moving body. Herein, the diagonal directions may represent directions of 45 degrees, −45 degrees, 225 degrees and −225 degrees from the moving direction (e.g., forward direction) of the moving body. Thus, a total of four cameras may be required. However, the above-described numerical values are just provided for an illustrative purpose, and the number of cameras, the arrangement direction of the cameras, and the FoVs of the cameras are not limited to the above-described numerical values.

As each camera has a wide FoV, it is possible to capture images for all directions (front views, side views and rear views) of the moving body even with a limited number of cameras. In addition, for all directions, there are overlapping regions captured by least two cameras, and this makes it possible to estimate how far an object is from the moving body. A detailed arrangement of the plurality of cameras and their ensuing effects are described later by referring to FIGS. 3 and 4.

In response to receiving the 1-st image to the p-th image from the 1-st camera to the p-th camera, the image processing device 1000 may perform image processing on the plurality of images received. For example, the cameras may be fisheye lens cameras that possess image distortion characteristics different from those of normal cameras. Accordingly, in order to more effectively perform processes, such as a process of estimating "corresponding pairs" on the images, which are described later, the image processing device 1000 may first perform a process of compensating for image distortion specific to the fisheye lens cameras on the images received.

For example, the image processing device 1000 may perform the image processing on the plurality of images by projecting a first image part, captured at a region where the FoVs of the plurality of cameras overlap, onto a planar model and projecting a second image part, captured at a region where the FoVs of the plurality of cameras do not overlap, onto a cylindrical model. Herein, there may be more than one first image part and more than one second image part for each of the cameras, and each first region or each second region of each of the cameras may be projected respectively onto their corresponding planar model and corresponding cylindrical model.

Herein, the image processing device 1000 may merge the first image part projected on the planar model and the second image part projected on the cylindrical model by using a hybrid projection model that smoothly connects the planar model and the cylindrical model. This is described in detail later by referring to FIG. 6.

Then, the image processing device 1000 may perform stereo matching on the plurality of images received to thereby obtain distance information on at least one object located in any direction of the moving body.

Herein, the image processing device 1000 may use originally obtained images to acquire the distance information on the object, but the present disclosure is not limited thereto.

As an example, the image processing device 1000 may input the plurality of images to a synthetic neural network to thereby extract a plurality of feature maps corresponding to the plurality of images and acquire the distance information on at least one object located in any direction of the moving body by using the plurality of feature maps. Correspondingly, when the feature maps are used instead of the original images, there is an effect of reducing computational load required during the stereo matching.

Thus so far, a process of acquiring the distance from the moving body to at least one object located in any direction of the moving body is schematically described, and detailed explanation is provided below.

Figure 3:
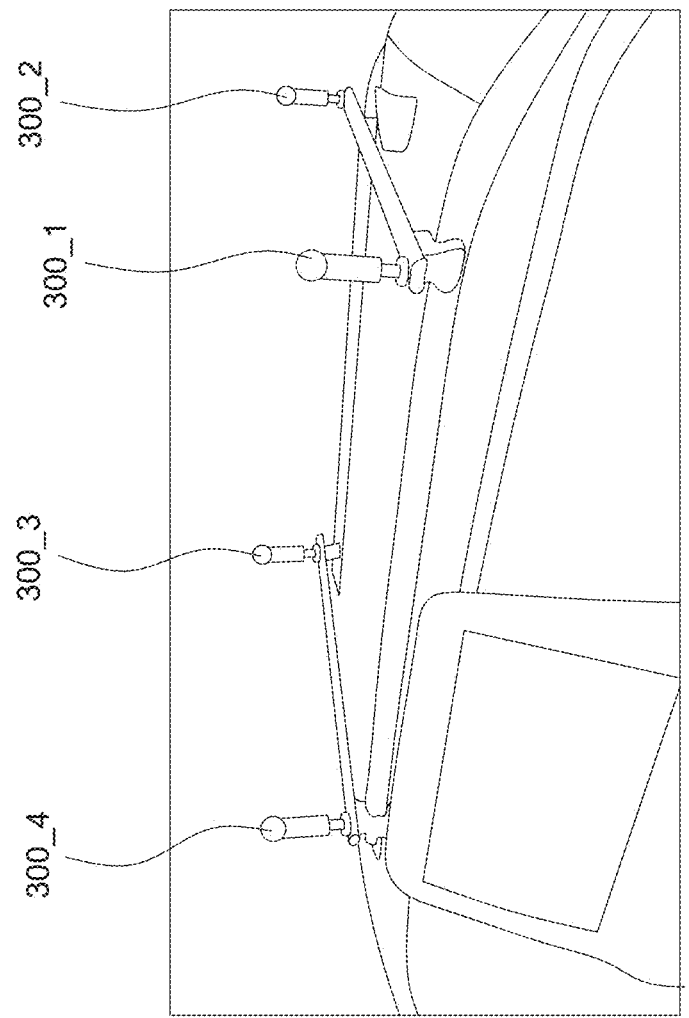
FIG. 3 is a drawing schematically illustrating a state of arranging the plurality of cameras to be apart from one another on the moving body in accordance with one example embodiment of the present disclosure.

FIG. 3 is a drawing schematically illustrating a state of arranging the 1-st camera to the p-th camera to be apart from one another on the moving body in accordance with one example embodiment of the present disclosure. Further, FIG. 4 is a drawing schematically illustrating image capturing ranges of the 1-st camera to the p-th camera in accordance with one example embodiment of the present disclosure.

Figure 4:
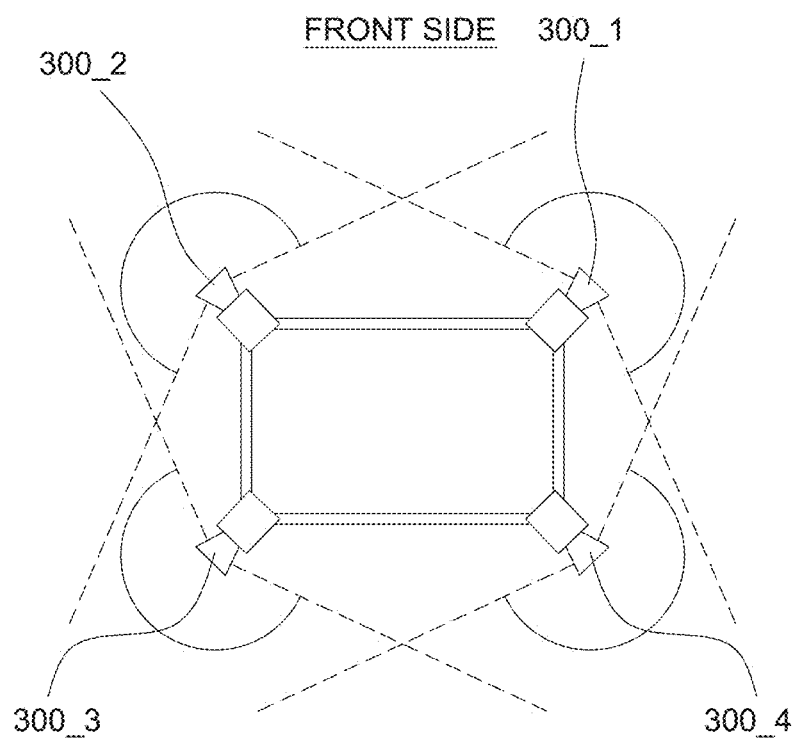
FIG. 4 is a drawing schematically illustrating image capturing ranges of the plurality of cameras in accordance with one example embodiment of the present disclosure.

By referring to FIGS. 3 and 4, it can be seen that four cameras 300_1, 300_2, 300_3, 300_4 are disposed on the moving body, for example, at each corner of a roof of a vehicle.

For example, a first camera 300_1 may be disposed on the right front side of the vehicle roof to thereby capture images of the right front side of the vehicle.

Also, a second camera 300_2 may be disposed on the left front side of the vehicle roof to thereby capture images of the left front side of the vehicle.

In this case, since FoV of the first camera 300_1 and FoV the second camera 300_2 overlap with each other at the front side of the vehicle, it is possible to estimate a distance between the vehicle and an object located at the front side of the vehicle.

Further, a third camera 300_3 may be disposed on the left back side of the vehicle roof to thereby capture images of the left back side of the vehicle.

In this case, since the FoV of the second camera 300_2 and FoV of the third camera 300_3 overlap with each other at the left side of the vehicle, it is possible to estimate a distance between the vehicle and an object located on the left side of the vehicle.

Also, a fourth camera 300_4 may be disposed on the right back side of the vehicle roof to thereby capture images of the right back side of the vehicle.

In this case, since the FoV of the third camera 300_3 and FoV of the fourth camera 300_4 overlap with each other at the back side of the vehicle, it is possible to estimate a distance between the vehicle and an object located at the back side of the vehicle.

In this case, since the FoV of the fourth camera 300_4 and the FoV of the first camera 300_1 overlap with each other at the right side of the vehicle, it is possible to estimate a distance between the vehicle and an object located on the right side of the vehicle.

Herein, each of the first to the fourth cameras 300_1, 300_2, 300_3, 300_4 described above may have a wide FoV (e.g. a FoV of 220 degrees) in horizontal direction and have a wide separation distance from each other (e.g. a separation distance of approximately 80 cm to 100 cm). Then, each pair comprised of two cameras spaced apart from each other for each of the front/left/right/rear sides of the vehicle may capture images for their respective sides.

In the example shown in FIGS. 3 and 4, the plurality of cameras 300_1, 300_2, 300_3, 300_4 have been illustrated as being disposed on the roof of the vehicle. However, as other possible arrangements, the cameras may alternatively be arranged on pillars of the vehicle (e.g. A-pillar and C-pillar) or on a bonnet or side mirrors of the vehicle.

Also, although the above-described example has illustrated the vehicle as a passenger car, other types of vehicles such as freight cars or various industrial vehicles may be used during implementation, in which case the cameras will be arranged in regions suitable to capture the surroundings of the vehicle omni-directionally.

In addition, the present disclosure may be applicable not only to moving bodies operated by wheels but also to moving bodies operated by caterpillar wheels, drones and ships operated by propellers, etc.

Further, the cameras described above are not limited to generating images belonging to a visible light spectrum, and may also generate images belonging to an infrared ray spectrum.

Meanwhile, in order to acquire an accurate distance to an object by using the images obtained from the cameras, it is first necessary to accurately estimate three-dimensional (3D) postures of the cameras arranged on the moving body.

Therefore, a method of performing a calibration process of the cameras is described below.

Figure 5:
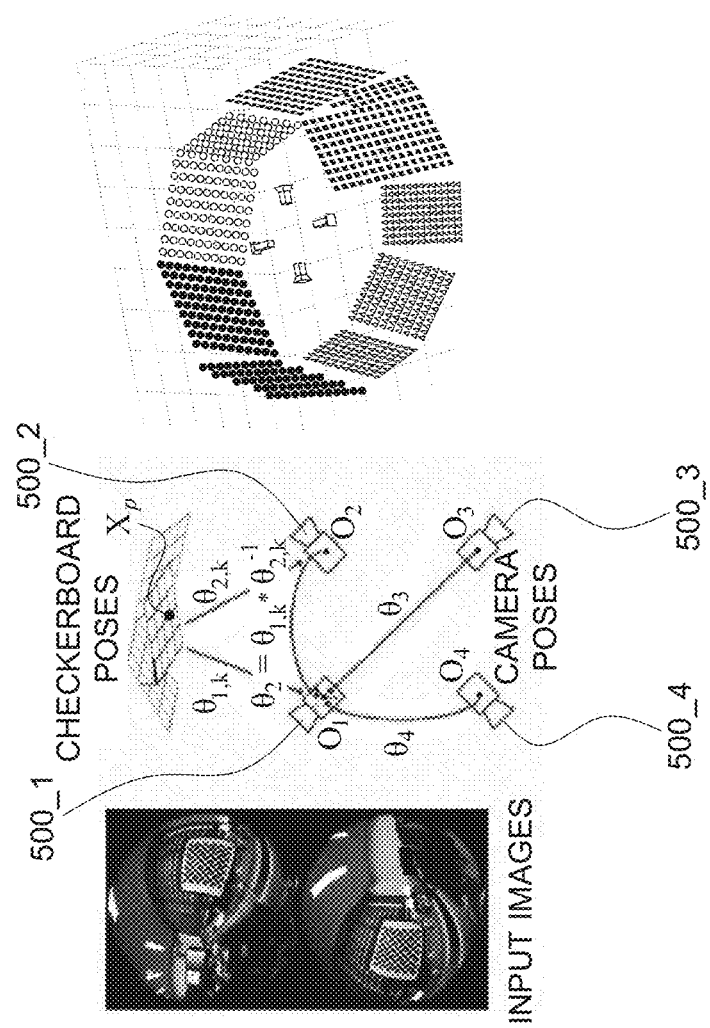
FIG. 5 is a drawing schematically illustrating a process of performing camera calibration in accordance with one example embodiment of the present disclosure.

FIG. 5 is a drawing schematically illustrating the process of performing camera calibration in accordance with one example embodiment of the present disclosure.

In a state of positioning a checker board to be simultaneously captured by two adjacent cameras, the two adjacent cameras may simultaneously capture the corresponding checker board as shown as an example in the reference images located on the left-side of FIG. 5.

Next, as shown in the illustration in the middle of FIG. 5, the image processing device 1000 may detect areas where the checker board is located in each of the reference images captured by each of the cameras, to thereby perform the camera calibration on the two adjacent cameras based on the areas detected. For example, the first camera 500_1 may be calibrated based on the second camera 500_2, the third camera 500_3 may be sequentially calibrated based on the second camera 500_2, and finally, the fourth camera 500_4 may be calibrated based on the second camera 500_2.

Alternatively, the four cameras 500_1, 500_2, 500_3, 500_4 may be calibrated at the same time by positioning checker boards in at least three of four directions (i.e., front direction, left direction, right direction and rear direction).

Herein, the image processing device 1000 may perform the calibration process to minimize a re-projection error between corner coordinates of the checker board on the reference images of the two adjacent cameras.

For example, the image processing device 1000 may calculate relative positions of each camera with respect to the checker board, and optimize external parameters and internal parameters of each of the cameras by referring to the relative positions.

For reference, the external parameters may be parameters related to relative postures of the cameras with respect to each other, and the internal parameters may be related to lens parameters of each of the cameras.

In other words, the optimization operation of the external parameters and the internal parameters may be carried out by (i-1) locating the checker board, having grid patterns thereon, in between the two adjacent cameras among the cameras arranged to be apart from one another on the moving body, and detecting each coordinate of each corner of the checker board by using the reference images obtained from the adjacent cameras, (i–2) performing the calibration process capable of optimizing one or more specific external parameters and one or more specific internal parameters of the adjacent cameras by referring to the each coordinate of each corner of the checker board such that the re-projection error between the reference images is minimized, and (ii) while selecting other two adjacent cameras among the cameras, repeatedly performing the calibration process for said other adjacent cameras, to thereby optimize the external parameters and the internal parameters of all the cameras.

Therefore, by performing the above-mentioned calibration process, posture information for each of the cameras may be calculated as shown on the right-side of FIG. 5. On the right-side of FIG. 5, different posture information for different cameras is indicated using different shape patterns.

More specifically, when a projection function (Π) maps a three-dimensional (3D) coordinate (X) onto a two-dimensional (2D) coordinate (x) in a normalized image plane, this can be expressed as Formula 1 stated below.

$$x = \Pi(X; \phi) \quad \langle \text{Formula 1} \rangle$$

Herein, x is the two-dimensional coordinate, X is the three-dimensional coordinate, and $\phi$ is an intrinsic parameter of a camera lens. In this case, the normalized image coordinate (x) may be converted into a pixel coordinate by using an affine transformation A(x).

Also, according to Formula 2 below, the calibration process may be performed to minimize the re-projection error between the corner coordinates of the checker board on the reference images of the two adjacent cameras.

$$\min_{\substack{\Phi_i, A_i \\ \Theta_i, \Theta_k}} \sum_{(i,k)} \sum_p \left\| \tilde{x}_{i,p} - A_i \left( \Pi \left( M(\Theta_i \star \Theta_k) \begin{bmatrix} X_p \\ 1 \end{bmatrix}; \phi_i \right) \right) \right\|^2 \quad \langle \text{Formula 2} \rangle$$

Herein, {(i,k)} is a set of observations of a checker board pose k with an $i^{th}$ camera. Also, $X_p$ is a coordinate of a corner location p in the checker board, and $\tilde{x}_{i,p}$ is a pixel coordinate of $X_p$ in an $i^{th}$ image.

Also, the external parameters may be expressed as $\Theta = (r^T, t^T)^T$. Herein, r may represent axial-angle rotation vector, and t may represent a translation vector (r,t∈ $R^3$).

In addition, a rigid conversion matrix M(Θ) may be given as [R(r) t] where R(r) may be a 3×3 rotation matrix corresponding to r.

Further, from a reference image of the $i^{th}$ camera, intrinsic parameters $\phi_i$, and $A_i$, as well as a relative position $\{\Theta_{i,k}\}$ of the checker board with respect to the $i^{th}$ camera may be denoted. Herein, k is a capture index.

Also, a relative position from the $i^{th}$ camera to a $j^{th}$ camera may be calculated as $\Theta_{j,k} * \Theta_{i,k}^{-1}$ from a pair of images (i,k) and (j,k) captured at the same time. Herein, * is a composition operation, and −1 is an inverse operation.

In addition, if the external parameter of the cameras is converted into $\{\Theta_i^*\}$ in a rig coordinate system, the projection function may be expressed as $A_i(\Pi(X; \phi_i))$.

Further, in response to external calibrations, poses $\{\Theta_i\}$ of all the cameras and poses $\{\Theta_k\}$ of all the checker boards may be initialized.

Also, a Ceres solver may be used to perform the optimization process.

Meanwhile, as for the cameras of the present invention, the fisheye lens cameras may be used to secure wide FoVs (Field of Views). Herein, even if fisheye images, outputted from the fisheye lens cameras, are capturing a same object, each of the fisheye images may depict the same object very differently from each other due to lens distortion. Accordingly, when relative posture information among the different cameras is not analyzed, it may be difficult to estimate corresponding pairs based on similarities found among the images, i.e., image similarities.

In accordance with one example embodiment of the present disclosure to overcome this problem, the relative posture information among the different cameras may be first acquired, and then an image projection model capable of effectively correcting distortions among the different fisheye images by referring to the relative posture information may be used in order to approximate the corresponding pairs based on the image similarities.

Figure 6:
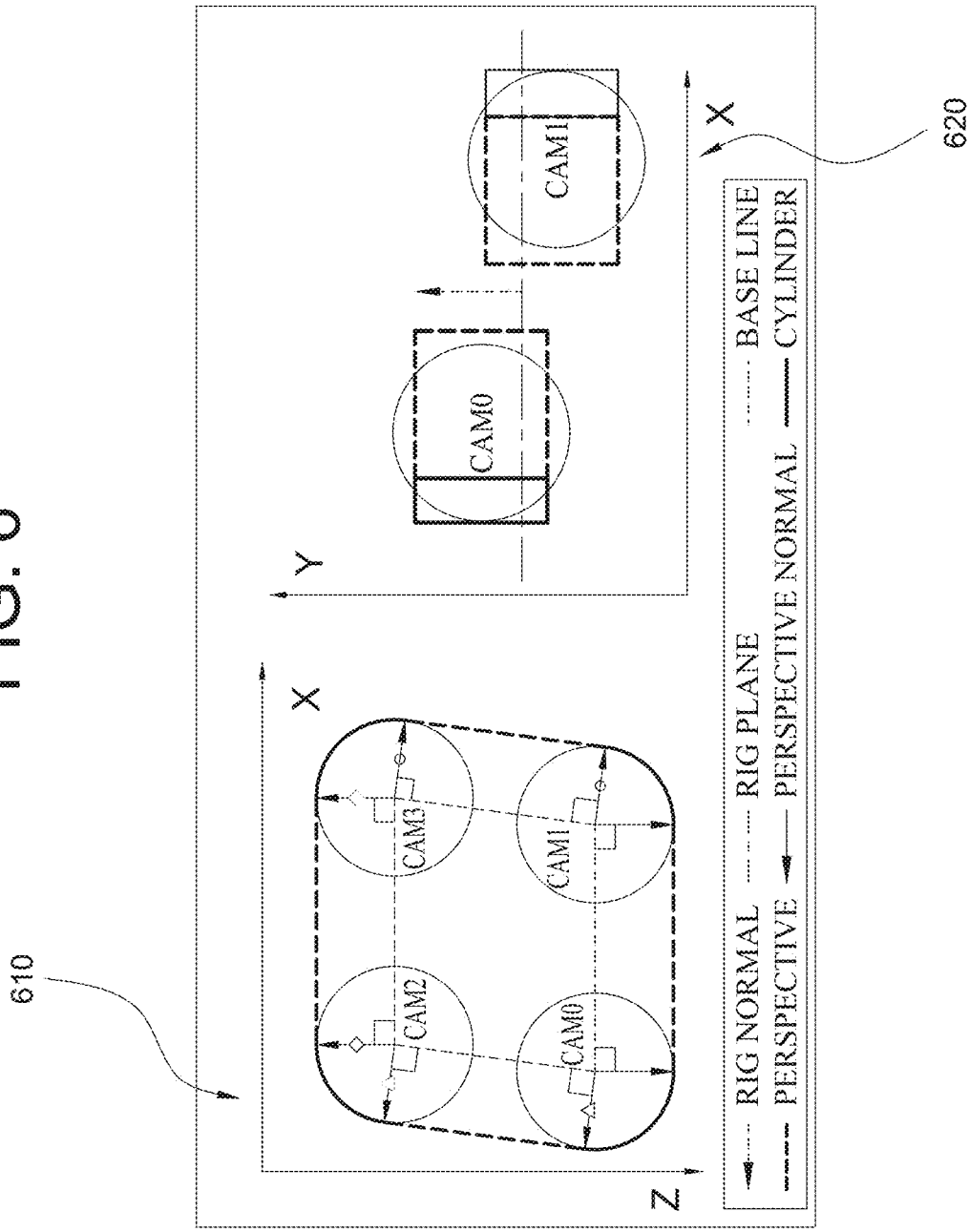
FIG. 6 is a drawing schematically illustrating an image projection model in accordance with one example embodiment of the present disclosure.

FIG. 6 is a drawing schematically illustrating the image projection model in accordance with one example embodiment of the present disclosure.

By referring to FIG. 6, a single plane 610 (a rig-plane, e.g., a x-z plane) that best represents three-dimensional positions of all the cameras may be determined by using a least square calculation, and subsequently another plane 620 (e.g., a x-y plane) that is parallel to lines connecting different adjacent cameras (inter-view) and perpendicular to the rig-plane 610 may be determined. Then, the distortions may be rectified by projecting image parts where the angles of views the adjacent cameras overlap onto their corresponding planar models and projecting image parts where the angles of views of the adjacent cameras do not overlap onto their corresponding cylindrical models.

In detail, in response to receiving the images from the cameras, the image processing device may process the images obtained from the cameras by repeatedly performing an image processing process, to thereby perform the optimization process with processed images, wherein the image processing process includes sub-processes of (i) determining the rig-plane including all the cameras thereon by using the least square calculation, (ii) acquiring information on a specific plane that is perpendicular to the rig-plane and is in parallel to a line connecting two adjacent cameras (baseline) among the plurality of cameras, (iii) projecting the first image part, captured at a region where the FoVs of the adjacent cameras overlap, onto the planar model parallel to the specific plane and projecting the second image part, captured at a region where the FoVs of the adjacent cameras do not overlap, onto the cylindrical model perpendicular to the specific plane, and (iv) obtaining the hybrid projection model by referring to the planar model and the cylindrical model.

Figure 7:
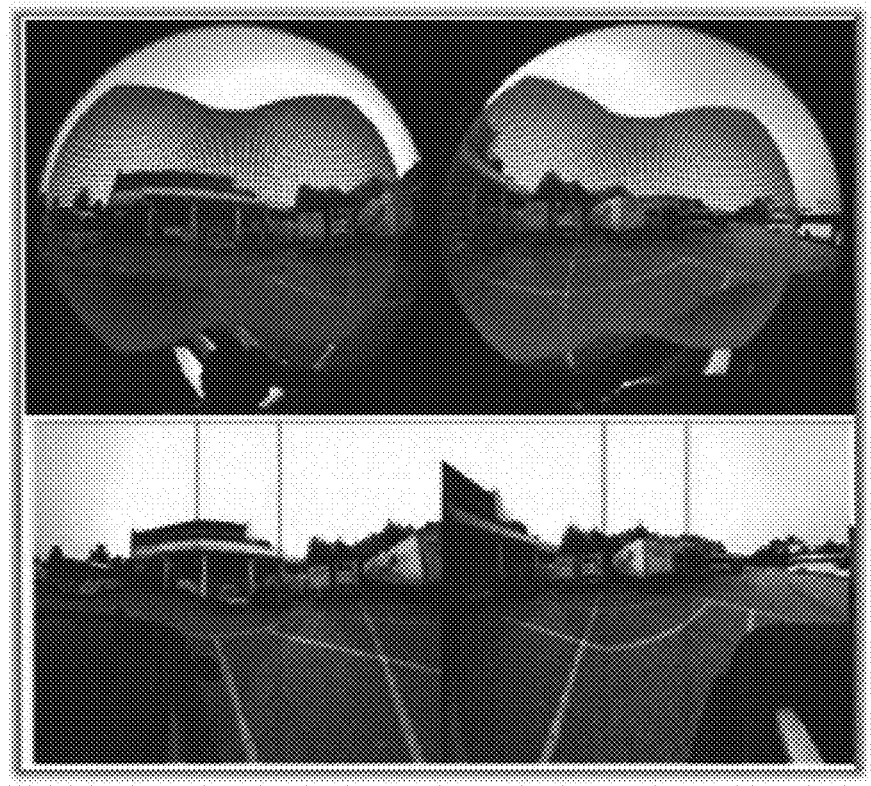
FIG. 7 is a drawing schematically illustrating a stereo image obtained as a result of using the image projection model in accordance with one example embodiment of the present disclosure.

FIG. 7 is a drawing schematically illustrating a stereo image obtained as a result of using the image projection model in accordance with one example embodiment of the present disclosure.

By referring to FIG. 7, it may be observed that corrected images as shown at the bottom of FIG. 7 are generated by improving distortions shown in those two images at the top of FIG. 7.

Meanwhile, conventional posture estimation methods are workable only when a corresponding pair of a two-dimensional point in a monocular camera image and an actual three-dimensional point is known.

On the other hand, the image processing device of the present disclosure has a different condition from the conventional posture estimation methods in that a multi-camera system is used, and thus a posture estimation algorithm applicable to the image processing device of the present disclosure is described by referring to FIG. 8.

FIG. 8 is a drawing schematically illustrating a camera posture estimation algorithm in accordance with one example embodiment of the present disclosure.

By referring to FIG. 8, when three corresponding pairs of 2D image points and actual 3D points are known in the multi-camera system, it is possible that postures of the cameras may be estimated based on a probabilistic distribution thereof.

In detail, after performing the image processing process, the image processing device 1000 may (i) select a specific camera from the plurality of cameras and sample multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly sample other multiple sets of other image points which include three other corresponding pairs for all other cameras except the specific camera among the cameras, to thereby acquire all pieces of a rig posture information of the rig, and confirm a geometric conformability of the rig posture information by applying all pieces of the rig posture information to all three corresponding pairs, including the three specific corresponding pairs and said three other corresponding pairs, and (iii) determine a certain set of image points which possesses most number of its corresponding pairs with errors smaller than or equal to a preset threshold and select certain rig posture information corresponding to the certain set of image points as optimized rig posture information for the rig to thereby minimize a first geometric error.

Herein, FIG. 8 illustrates one example of determining the optimized rig posture information. Given that the corresponding pairs $\{\{(\bar{x}_{i_j}, {}^w X_{i_j})\}_{i_j}\}_j$ of all the cameras are found, the specific camera may be randomly selected with Probability Proportional to the Size of match pairs (PPS sampling), wherein the PPS sampling may choose the specific cameras that have most number of corresponding pairs based on the assumption that cameras with more match pairs are likely to yield more accurate rig posture information. Then, rig posture candidates may be estimated by using a conventional monocular P3P algorithm on the corresponding pairs of the specific camera, and the geometric conformability, i.e., inlier check, of all the rig posture candidates against all corresponding pairs of all the cameras, may be tested to determine the optimized rig posture information that has the most number of its corresponding pairs with errors smaller than or equal to a preset threshold. Thus, the optimized rig posture information may be determined by referring to an output rig posture ${}_w^b\theta$ obtained at the end of the RANSAC loop.

Meanwhile, the cameras are installed and operated on a single moving body such as a vehicle, and the postures of the cameras may be changed due to shaking of the vehicle, etc. Given the fact that the posture information of the cameras is used for estimating the distance information on the object, errors may occur in estimating final distance information if changed posture information of the cameras is not taken into account.

Therefore, in order to estimate the distance between the object and the moving body by accurately reflecting the changes posture information of the cameras, the image processing device 1000 of the present disclosure may ensure the reliability of the distance estimation by simultaneously optimizing the posture information of the cameras, a surrounding environment map and the relative posture information among the cameras.

In detail, in the state that the cameras are arranged to be apart from one another on the rig mounted on the moving body, the image processing device 1000 may minimize (i) the first geometric error associated with camera posture information of the cameras corresponding to rig posture information of the rig, (ii) a second geometric error associated with 3D points corresponding to the surrounding environment map on a location of the moving body, and (iii) a third geometric error associated with external parameters including the relative posture information among the cameras, to thereby perform an optimization process that tracks changes in the camera posture information caused by movements of the moving body.

Since the image processing device 1000 of the present disclosure may track the changes in the camera posture information by checking the postures of the cameras in real time as described above, a drop in the performance of the distance estimation caused by the movement of the moving body may be prevented.

Given that the optimization process is completed as state above, the image processing device 1000 may input the 1-st image to the p-th image to a sweep network and instruct the sweep network to project a plurality of pixels on the 1-st image to the p-th image onto N main virtual geometries, respectively formed on the basis of a predetermined main reference point or a predetermined main reference virtual geometry, to thereby generate a plurality of main stereoscopic images.

For reference, as described above, the image processing device 1000 may (i) input the 1-st image to the p-th image to the sweep network to generate the main stereoscopic images in accordance with one example embodiment of the present disclosure, but instead may (ii) input the 1-st image to the p-th image to a plurality of 2D convolution layers to generate a 1-st feature map to a p-th feature map corresponding to the 1-st image to the p-th image, and then input the 1-st feature map to the p-th feature map into the sweep network to thereby instruct the sweep network to generate the main stereoscopic images from the 1-st feature map to the p-th feature map in accordance with another example embodiment of the present disclosure.

Herein, each of the N main virtual geometries may be centered on a first main reference point which is the predetermined main reference point set by referring to a 1-st position of the 1-st camera to a p-th position of the p-th camera. Also, the N main virtual geometries may correspond to N main virtual spheres whose radii are respectively a (1_1)-st main separation distance to a (1_N)-th main separation distance. Herein, the (1_1)-st main separation distance to the (1_N)-th main separation distance are elements of the N main separation distances.

As another example, the N main virtual geometries may correspond to N main virtual rounded cuboids each of which includes a main extended plane set, having three main extended planes, and main curved surfaces interconnecting at least two of the three main extended planes, wherein the three main extended planes are respectively formed at a (2_1)-st main separation distance to a (2_N)-th main separation distance from each of three main reference planes of the main reference virtual geometry, and wherein the three main reference planes are orthogonal to one another.

Herein, the main reference virtual geometry may be centered on a second main reference point that is set as the predetermined main reference point by referring to the 1-st position of the 1-st camera to the p-th position of the p-th camera.

Also, an aspect ratio of the main reference virtual geometry may be determined by referring to an aspect ratio of the structure of the moving body or an aspect ratio of a virtual cuboid circumscribed to the moving body.

Figure 9:
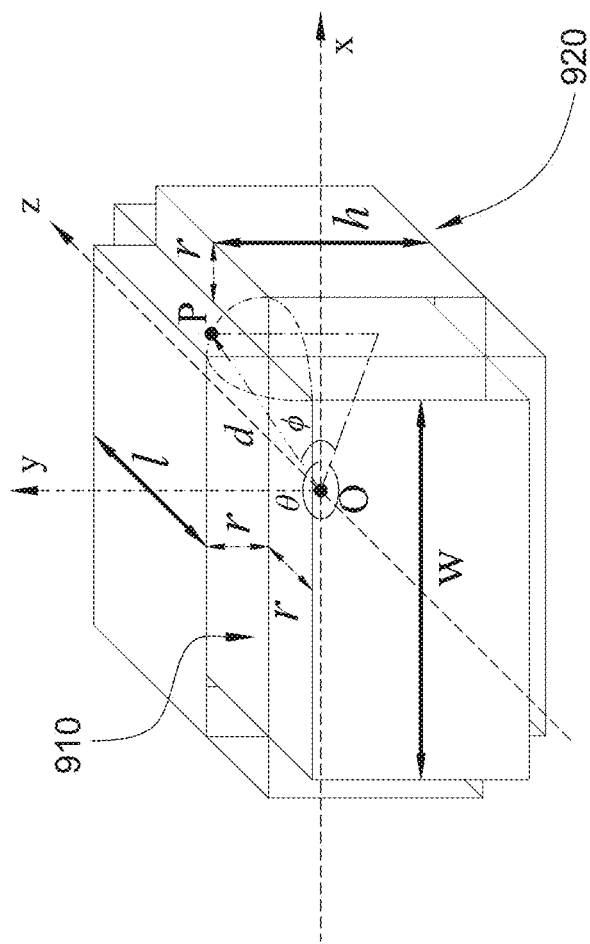
FIG. 9 is a drawing schematically illustrating a main reference virtual geometry and a main virtual rounded cuboid in accordance with one example embodiment of the present disclosure.

The main reference virtual geometry and the main virtual rounded cuboid are explained in more detail by referring to FIG. 9.

FIG. 9 is a drawing schematically illustrating the main reference virtual geometry 910 and the main virtual rounded cuboid 920 in accordance with one example embodiment of the present disclosure.

For reference, FIG. 9 only illustrates one main virtual rounded cuboid for convenience of explanation, but the present disclosure does not exclude cases where the N main virtual rounded cuboids are used.

By referring to FIG. 9, the main reference virtual geometry may be a cuboid. Herein, three edges of the main reference virtual geometry 910 may correspond to three axes (e.g. x-axis, y-axis and z-axis) that are orthogonal to each other, and the three edges may have lengths of w, h and l.

Also, to illustrate any one of the N main virtual rounded cuboids for instance, the main virtual rounded cuboid 920 may include the main extended plane set having the three main extended planes, and the main curved surfaces interconnecting at least two of the three main extended planes, and each of the three main extended planes may be formed at each of separation distances (e.g., a radius r) from each of the three main reference planes (e.g., three types of planes respectively parallel to x-y plane, y-z plane and x-z plane) of the main reference virtual geometry 910. Herein, the three main reference planes are orthogonal to one another.

For example, the main virtual rounded cuboid may include (i) a first main extended plane formed at a separation distance r from both sides of the main reference virtual geometry (i.e., along x-axis), (ii) a second main extend plane formed at the separation distance r from the front and the back of the main reference virtual geometry (i.e., along z-axis), (iii) a third main extend plane formed at the separation distance r from the top and the bottom of the main reference virtual geometry (i.e., along y-axis), and (iv) the main curved surfaces interconnecting at least two of the three main extended planes.

Also, in FIG. 9, each of the main extended planes included in the main extended plane set of the main virtual rounded cuboid 920 is illustrated as being formed at the same separation distance r from each of their respective main reference planes of the main reference virtual geometry 910, but the present disclosure is not limited thereto.

Herein, a K-th main virtual rounded cuboid among the N main virtual rounded cuboids includes (i) a K-th main extended plane set having a (K_1)-st main extended plane, a (K_2)-nd main extended plane and a (K_3)-rd main extended plane, and (ii) a K-th main curved surface interconnecting at least two of the (K_1)-st main extended plane, the (K_2)-nd main extended plane and the (K_3)-rd main extended plane, wherein the (K_1)-st main extended plane, the (K_2)-nd main extended plane and the (K_3)-rd main extended plane are respectively formed at a (K_1)-st main separation distance, a (K_2)-nd main separation distance and a (K_3)-rd main separation distance respectively from a first main reference plane, a second main reference plane and a third main reference plane which are the three main reference planes of the main reference virtual geometry. Herein, K is an integer bigger than or equal to 1 and smaller than or equal to N.

Herein, (i) a (K_1&2)-th main curved surface connecting the (K_1)-st main extended plane and the (K_2)-nd main extended plane, (ii) a (K_2&3)-th main curved surface connecting the (K_2)-nd main extended plane and the (K_3)-rd main extended plane, (iii) a (K_3&1)-th main curved surface connecting the (K_3)-rd main extended plane and the (K_1)-st main extended plane, and (iv) a (K_1&2&3)-th main curved surface connecting the (K_1)-st main extended plane, the (K_2)-nd main extended plane and the (K_3)-rd main extended plane may be included in the K-th virtual rounded cuboid as the K-th main curved surface.

Meanwhile, in the following, FIGS. 10A to 10G are used to schematically illustrate a method for computing a specific distance $d_i$ equivalent to a distance between the second main reference point of the main reference virtual geometry and a specific point on an i-th main virtual rounded cuboid in accordance with one example embodiment of the present disclosure.

For reference, as mentioned above, the main extended plane set of the main virtual rounded cuboid may include each of the main extended planes formed at each of different distances from each of the three main reference planes of the main reference virtual geometry, but for convenience of explanation, the i-th main virtual rounded cuboid may be assumed to be formed at a same main separation distance $r_i$ from the main reference virtual geometry.

Figure 10A:
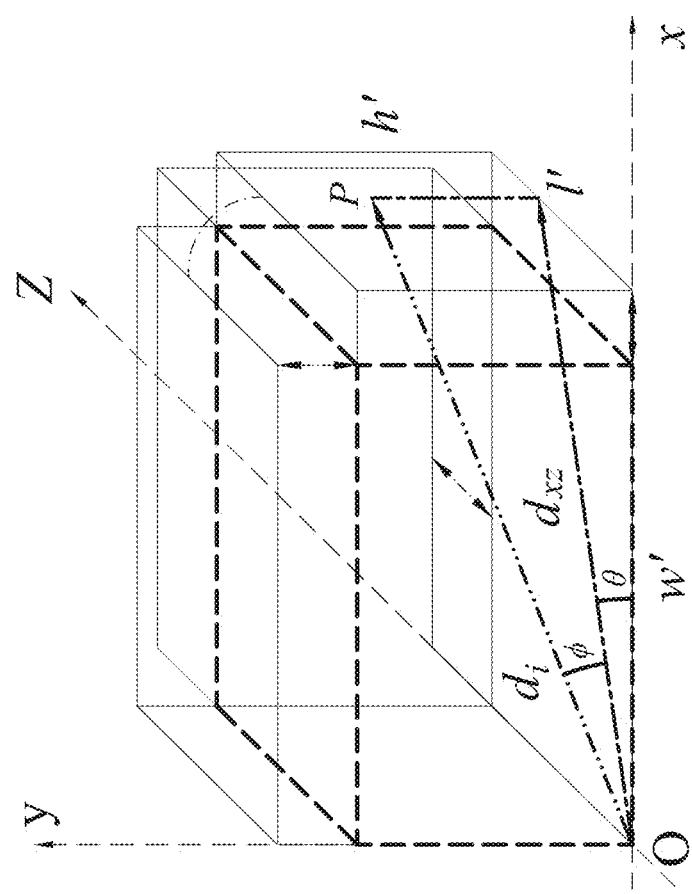

First, by referring to FIG. 10A, a specific distance $d_i$ from the second main reference point of the main reference virtual geometry to a specific point P on the i-th main virtual rounded cuboid may be determined according to an equation below.

$$d_i = f(r_i, \theta, \Psi; w, h, l)$$

Herein, (i) $r_i$ is a separation distance between the main reference virtual geometry and the i-th main virtual rounded cuboid, (ii) $\theta$ and $\Psi$ are respectively an azimuth angle and a polar angle of a virtual line segment OP connecting the specific point P and the second main reference point of the main reference virtual geometry in a spherical coordinate system having the second main reference point as an origin thereof, and (iii) w, h and l are respectively lengths of a first edge, a second edge and a third edge of the main reference virtual geometry which are orthogonal to one another.

For reference, in FIGS. 10A to 10G, only a part of the i-th main virtual rounded cuboid and a part of the main reference virtual geometry obtained by bisecting the length w of the first edge, the length h of the second edge and the length l of the third edge of the main reference virtual geometry are illustrated. That is, the part of the main reference virtual geometry illustrated in FIGS. 10A to 10G may be a cuboid whose edges corresponding to x-axis, y-axis and z-axis have lengths equivalent to w' (=w/2), h' (=h/2) and l' (=l/2).

Those skilled in the art will readily understand that the same description may be applied to parts not shown in the drawings.

By referring to FIG. 10A again, the distance $d_i$ between the second main reference point O and the specific point P located on an (i_1)-st main extended plane of the i-th main virtual rounded cuboid which is formed at the separation distance $r_i$ from the first main reference plane parallel to the y-z plane may be calculated by equations below.

$$d_{xz} = (w' + r_i)/\cos(\theta)$$

$$d_i = d_{xz}/\cos(\Psi)$$

Figure 10B:
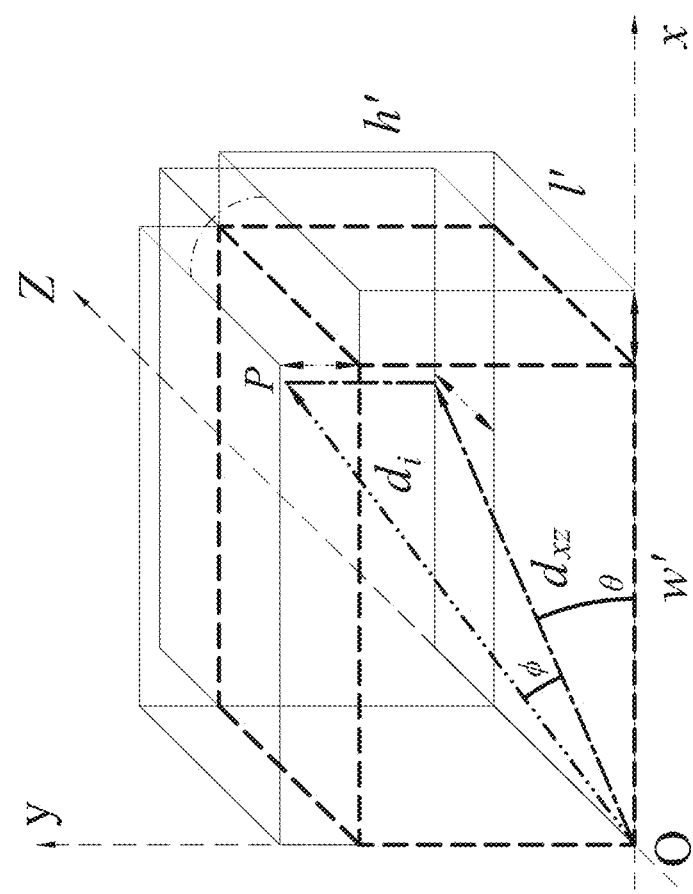

Next, by referring to FIG. 10B, the distance $d_i$ between the second main reference point O and the specific point P located on an (i_2)-nd main extended plane of the i-th main virtual rounded cuboid which is formed at the separation distance $r_i$ from the second main reference plane parallel to the x-y plane may be calculated by equations below.

$$d_{xz}=(l'+r_i)/\sin(\theta)$$

$$d_i=d_{xz}/\cos(\Psi)$$

Figure 10C:
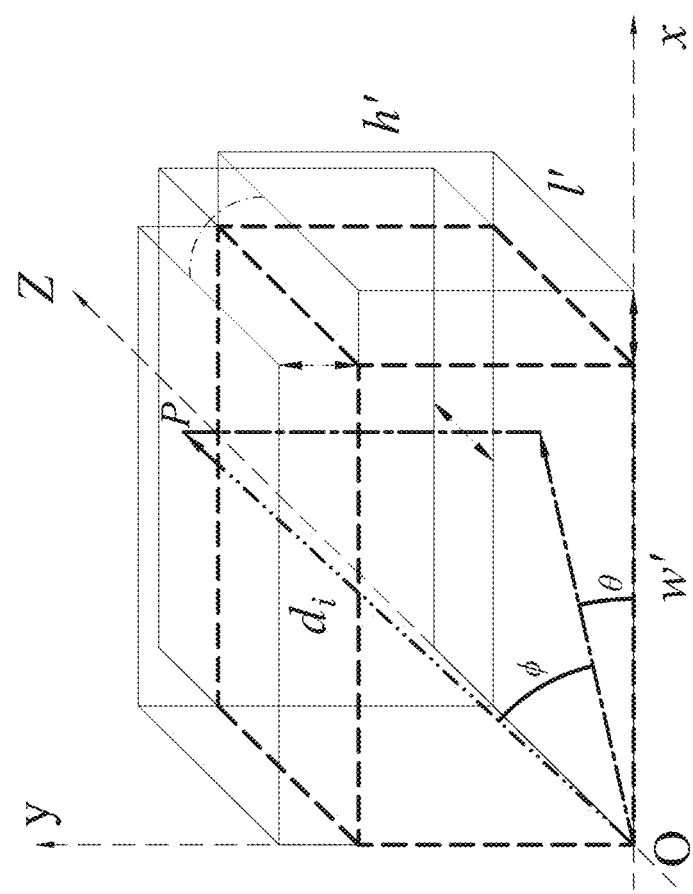

Further, by referring to FIG. 10C, the distance $d_i$ between the second main reference point O and the specific point P located on an (i_3)-rd main extended plane of the i-th main virtual rounded cuboid which is formed at the separation distance $r_i$ from the third main reference plane parallel to the x-z plane may be calculated by an equation below.

$$d_i=(h'+r_i)/\sin(\Psi)$$

Also, by referring to FIG. 10D, the distance $d_i$ between the second main reference point O and the specific point P located on an (i−1&2)-th main curved surface that connects (i) the (i_1)-st main extended plane of the i-th main virtual rounded cuboid which is formed at the separation distance $r_i$ from the first main reference plane parallel to the y-z plane and (ii) the (i_2)-nd main extended plane of the i-th main virtual rounded cuboid which is formed at the separation distance $r_i$ from the second main reference plane parallel to the x-y plane may be calculated by equations below.

$$b=w'*\cos(\theta)+l'*\sin(\theta)$$

$$d_{xz}=\frac{b+\sqrt{b^2-w'^2-l'^2+r^2}}{\sin\theta}$$

$$d_i=d_{xz}/\cos(\Psi)$$

Figure 10E:
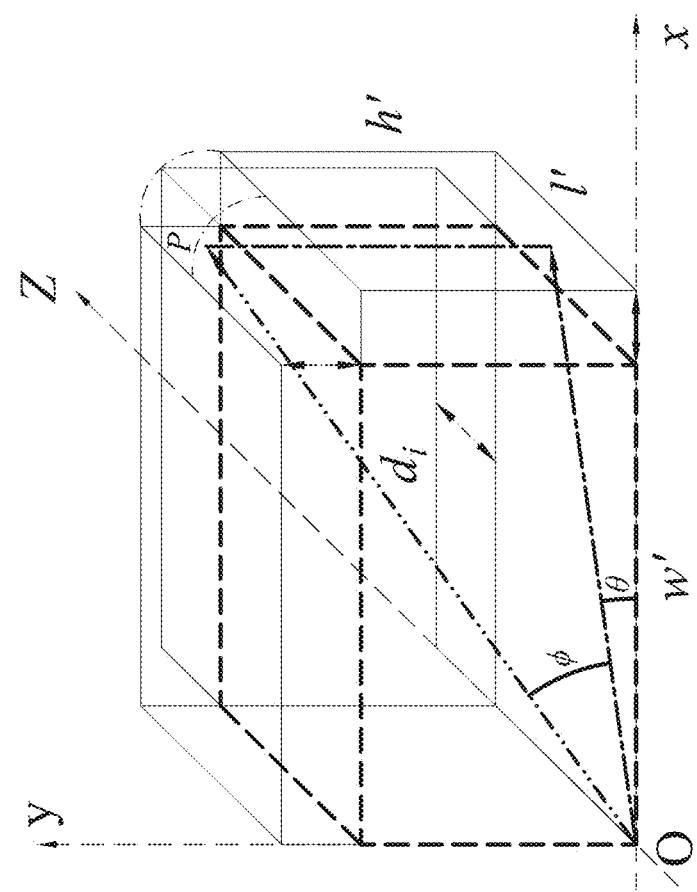

In addition, by referring to FIG. 10E, the distance $d_i$ between the second main reference point O and the specific point P located on an (i−1&3)-th main curved surface that connects (i) the (i_1)-st main extended plane of the i-th main virtual rounded cuboid which is formed at the separation distance $r_i$ from the first main reference plane parallel to the y-z plane and (ii) the (i_3)-rd main extended plane of the i-th main virtual rounded cuboid which is formed at the separation distance $r_i$ from the third main reference plane parallel to the x-z plane may be calculated by equations below.

$$a=\cos^2(\Psi)+\cos^2(\theta)+\sin^2(\Psi)$$

$$b=w'*\cos(\Psi)*\cos(\theta)+h'*\sin(\Psi)$$

$$c=w'^2+h'^2-r^2$$

$$d_i=\frac{b+\sqrt{b^2-ac}}{a}$$

Figure 10F:
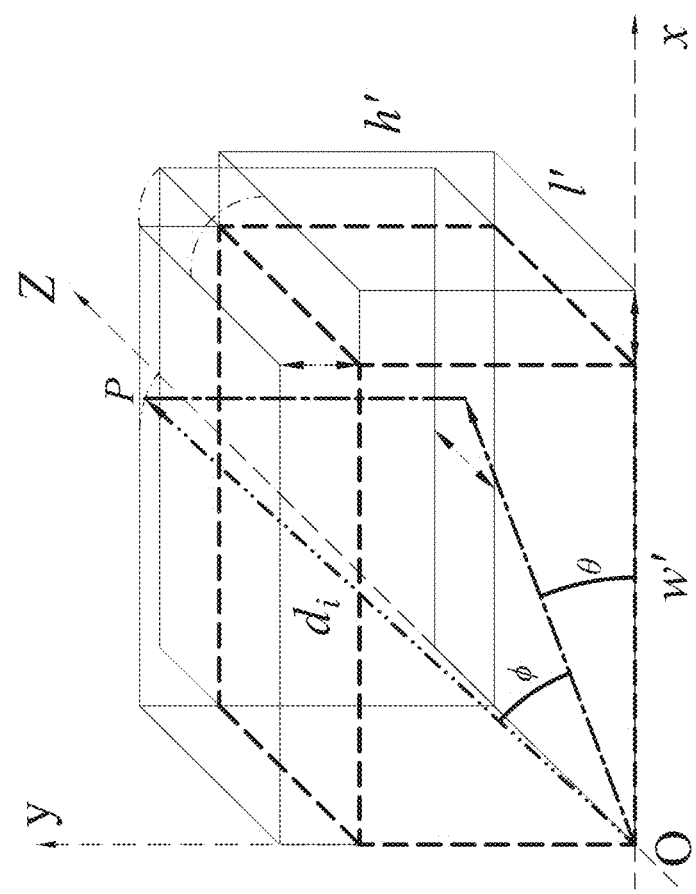

Further, by referring to FIG. 10F, the distance $d_i$ between the second main reference point O and the specific point P located on an (i−2&3)-th main curved surface that connects (i) the (i_2)-nd main extended plane of the i-th main virtual rounded cuboid which is formed at the separation distance $r_i$ from the second main reference plane parallel to the x-y plane and (ii) the (i_3)-rd main extended plane of the i-th main virtual rounded cuboid which is formed at the separation distance $r_i$ from the third main reference plane parallel to the x-z plane may be calculated by equations below.

$$a=\cos^2(\Psi)+\sin^2(\theta)+\sin^2(\Psi)$$

$$b=l'*\cos(\Psi)*\sin(\theta)+h'*\sin(\Psi)$$

$$c=l'^2+h'^2-r^2$$

$$d_i=\frac{b+\sqrt{b^2-ac}}{a}$$

Figure 10G:
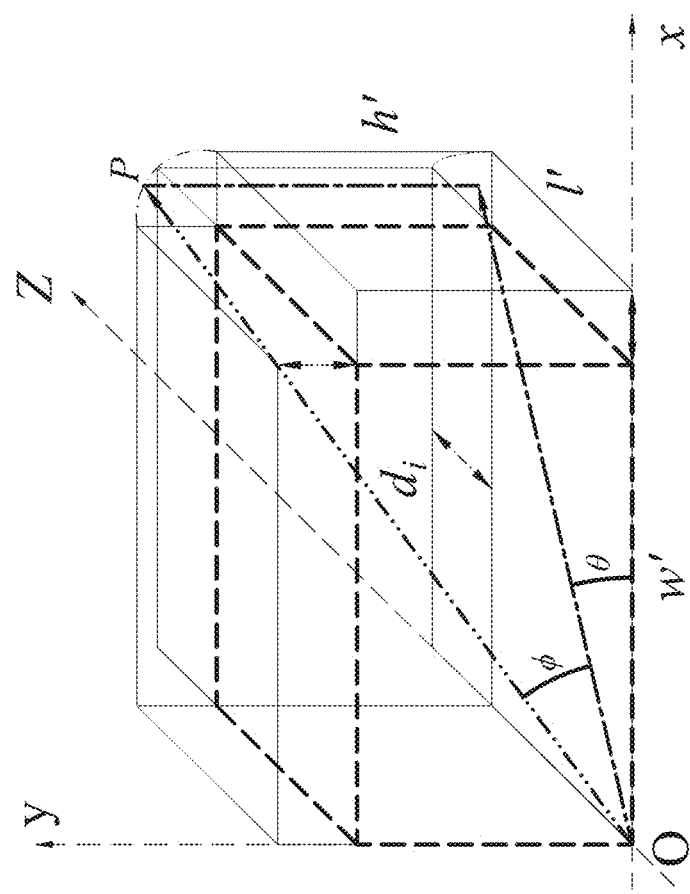

Also, by referring to FIG. 10G, the distance $d_i$ between the second main reference point O and the specific point P located on an (i−1&2&3)-th main curved surface that connects (i) the (i_1)-st main extended plane of the i-th main virtual rounded cuboid which is formed at the separation distance $r_i$ from the first main reference plane parallel to the y-z plane, (ii) the (i_2)-nd main extended plane of the i-th main virtual rounded cuboid which is formed at the separation distance $r_i$ from the second main reference plane parallel to the x-y plane and (iii) the (i_3)-rd main extended plane of the i-th main virtual rounded cuboid which is formed at the separation distance $r_i$ from the third main reference plane parallel to the x-z plane may be calculated by equations below.

$$b=h'*\sin(\Psi)+w'*\cos(\theta)*\cos(\Psi)+l'*\cos(\Psi)*\sin(\theta)$$

$$c=h'^2+w'^2+l'^2-r^2$$

$$d_i=b+\sqrt{b^2-c}$$

Meanwhile, a specific distance between the first main reference point and a specific point on an i-th main virtual sphere may correspond to a radius of a main virtual sphere, and thus a detailed description thereof will be omitted Accordingly, after the plurality of main stereoscopic images are generated by projecting the plurality of pixels on the 1-st image to the p-th image onto the N main virtual geometries, the image processing device 1000 may instruct the sweep network to apply three-dimensional (3D) concatenation operation to the plurality of the main stereoscopic images, thus to generate an initial four-dimensional (4D) cost volume.

For reference, in the spherical coordinate system, a ray $p=(\theta, \phi)$ may correspond to $\rho(p)=(\cos(\phi)\cos(\theta), \sin(\phi), \cos(\phi)\sin(\theta))^T$ in a Cartesian coordinate system.

Specifically, each pixel on the main stereoscopic images projected onto the N main virtual geometries may be expressed as $(\theta, \Psi)$. As an example, these main stereoscopic images may have a resolution of W*H. Also, the azimuth angle $\theta$ may vary from $-\pi$ to $\pi$, and the polar angle L may vary from $-\pi/2$ to $\pi/2$.

Also, as for a separation distance $r_N$ (i.e., radius), a relationship $r_N=1/r_N^{-1}$ may be established. Herein, $r_N^{-1}$ represents a main inverse distance, and particularly $r_N^{-1}$ represents (i) a main inverse depth for each of the main virtual spheres and (ii) a main inverse radius for each of the main virtual rounded cuboids.

In addition, the N main virtual geometries may be sampled such that their main inverse depths or main inverse radii are uniform.

For example, when a minimum main radius is $r_{min}$, the main inverse radius $r_N^{-1}$ of an N-th main virtual rounded cuboid is $r_N = n/r_{min}$ (N−1), wherein n∈[0, ..., N−1].

Further, if the external parameter of the cameras is converted into $\{\Theta_i^*\}$ in the rig coordinate system, the projection function may be expressed as $A_i(\Pi(X; \phi_i))$.

Based on the description above, a formula to compute pixel values of main sphere images projected onto the main virtual spheres may be expressed as below.

$$S_{i,n}(p) = I_i\left(\prod_i \left(M(\Theta_i^*) \begin{bmatrix} p(p)/r_N \\ 1 \end{bmatrix}\right)\right) \quad \langle\text{Formula 3}\rangle$$

Meanwhile, a formula to compute pixel values of main rounded cuboid images projected onto the main virtual rounded cuboids may be expressed as below.

$$S_{i,n}(p) = I_i\left(\prod_i \left(M(\Theta_i^*) \begin{bmatrix} p(p)^* f(r_N, \theta, \Psi; w, h, l) \\ 1 \end{bmatrix}\right)\right) \quad \langle\text{Formula 4}\rangle$$

Herein, as explained above, $f(r_N, \theta, \Psi; w, h, l)$ may represent a specific distance $d_N$ from the second main reference point of the main reference virtual geometry to a specific point P on an N-th main rounded cuboid image projected onto the N-th main virtual rounded cuboid. That is, $d_N = f(r_N, \theta, \Psi; w, h, l)$.

Herein, $I_i$ is an input image captured from the i-th camera. Meanwhile, when the projected pixels are not in the visible region of the input image, these projected pixels may not be considered in further processing.

Since either the images or the feature maps corresponding to the images may be projected onto the main virtual geometries through sweeping, Formula 3 and Formula 4 may be modified to Formula 5 and Formula 6 below in case the feature maps are projected onto the main virtual geometries.

For example, Formula 3 may be expressed as Formula 5 below in case the feature maps are projected onto the main virtual spheres.

$$S_i(\Psi, \theta, n, c) = U_c\left(\frac{1}{r}\prod_i (p(\theta, \Psi)/r_N)\right) \quad \langle\text{Formula 5}\rangle$$

Similarly, Formula 4 may be expresses as Formula 6 below in case the feature maps are projected onto the main virtual rounded cuboids.

Herein, through a feature extraction process such as a unary feature extraction process, the plurality of feature maps may be acquired by inputting the plurality of images obtained from the cameras into convolution neural networks (e.g., 2D CNN). Herein, the unary feature extraction process is a process for estimating the distance even with a small amount of computation, and thus may be a process selectively performed according to hardware specifications of the image processing device. Herein, for example, the unary feature map $U = F_{CNN}(I)$ may have a $1/rH_I \times 1/rW_I \times C$ dimensions, wherein $F_{CNN}$ is a 2D CNN for the feature extraction, $H_I$ and $W_I$ are the height and width of the input image, r is the reduction factor, and C is the number of channels.

$$S_i\left(\Psi, \theta, n, c\right) = U_c\left(\frac{1}{r}\prod_i (p(\theta, \Psi)^* f(r_N, \theta, \Psi; w, h, l))\right) \quad \langle\text{Formula 6}\rangle$$

Herein, to ensure sufficient disparities between neighboring warped feature maps and to reduce the memory and computation overhead, every other main virtual rounded cuboids, i.e., n∈[0, 2, ..., N−1], may be used to produce the feature volume $S_i$.

Next, in a cost volume computation process, the feature volumes may be converted to include physical space information for three-dimensional areas in all directions, and a resultant merged outcome may be reflected on a 3D encoder-decoder to generate a depth map.

In detail, the image processing device 1000 may apply the three-dimensional (3D) concatenation operation to the plurality of the main stereoscopic images to generate the initial four-dimensional (4D) cost volume, and may input the initial 4D cost volume to a cost volume computation network, including a plurality of 3D convolution layers and their corresponding 3D deconvolution layers, to thereby generate a final main 3D cost volume.

In this way, the image processing device 1000 may be able to acquire the distance to at least one object from the moving body by only using the final main 3D cost volume alone. That is, the final main 3D cost volume, i.e., a global cost volume, that is generated with reference to the main reference point set by referring to the 1-st position of the 1-st camera to the p-th position of the p-th camera may be used alone to acquire the distance to the object.

However, as mentioned above, the distance to the object acquired by using the global cost volume alone may be somewhat inaccurate. Therefore, the image processing device 1000 may additionally use a cost volume for each camera, i.e., a local cost volume in order to obtain more accurate distance information to the object.

Hereinafter, a method of the image processing device 1000 generating the local cost volume, i.e., a sub cost volume, by using the final main 3D cost volume in accordance with one example embodiment of the present disclosure is described.

Figure 11:
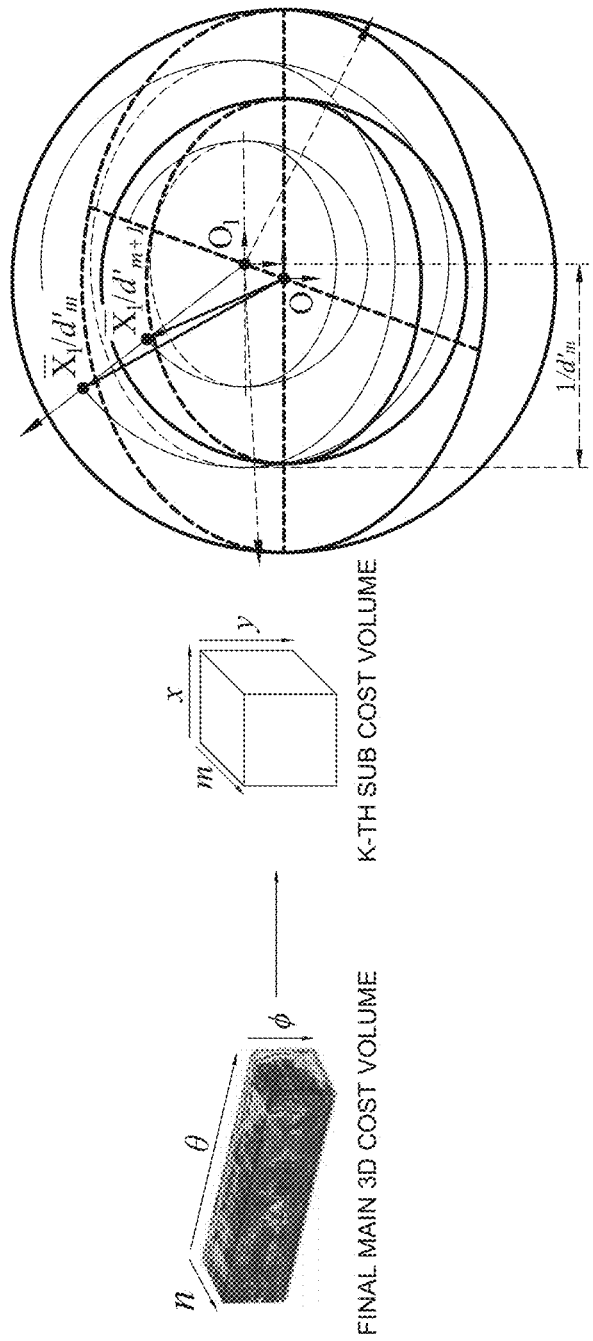
FIG. 11 is a drawing schematically illustrating a process of generating a k-th sub cost volume by using a final main three-dimensional (3D) cost volume in accordance with one example embodiment of the present disclosure.

By referring to FIG. 11, multiple spheres drawn with thicker lines represent the main virtual spheres which have the first main reference point O as their center. On the other hand, multiple spheres drawn with thinner lines in FIG. 11 represent multiple k-th sub virtual spheres of a k-th camera which have a k-th sub reference point $O_1$ as their center.

In accordance with the present disclosure, the image processing device 1000 may project a plurality of pixels on a k-th image, generated from the k-th camera among the 1-st camera to the p-th camera, onto M k-th sub virtual geometries, respectively formed on a basis of a predetermined k-th sub reference point, to thereby generate a plurality of k-th sub stereoscopic images.

Herein, the M k-th sub virtual geometries may be centered on the predetermined k-th sub reference point set by referring to a k-th position of the k-th camera. Also, the M k-th sub virtual geometries may correspond to M k-th sub virtual spheres whose radii are respectively a (k_1)-st sub separation distance to a (k_M)-th sub separation distance.

The, the image processing device 1000 may (i) convert each of positions of each of a plurality of pixels on the plurality of the k-th sub stereoscopic images on the basis of the predetermined main reference point, to thereby acquire k-th 3D pixel coordinates, (ii) apply the k-th 3D pixel coordinates to the final main 3D cost volume to thereby acquire a k-th sub cost factor, and (iii) generate a k-th sub cost volume by using the k-th sub cost factor.

For reference, for convenience of explanation, FIG. 11 shows the main virtual spheres as the main virtual geometries, but the present disclosure is not limited thereto, and the main virtual rounded cuboids may also be the main virtual geometries.

Hereinafter, a process for generating the k-th sub cost volume $\mathcal{J}_k(x,y,m)$ of FIG. 11 is explained in detail by referring to Formulae 7 and 8.

$$\overline{X}_k = \prod_k^{-1} \begin{bmatrix} x \\ y \end{bmatrix} \quad \langle \text{Formula 7} \rangle$$

$$\mathcal{J}_k(x, y, m) = C\left(M(\Theta_k^{-1})\begin{bmatrix} \overline{X}_k/d'_m \\ 1 \end{bmatrix}\right) \quad \langle \text{Formula 8} \rangle$$

Herein, 2D coordinates (x,y) on the k-th image of the k-th camera may be mapped to 3D ray $\overline{X}_k$ through $\Pi_k^{-1}$ (corresponding to internal parameters of the k-th camera) of Formula 7.

For reference, $d_m'$ in Formula 8 represents the (k_M)-th sub separation distance between a specific k-th sub virtual sphere among the M k-th sub virtual spheres (e.g., an m-th sub virtual sphere among the k-th sub virtual spheres) and the k-th sub reference point (i.e., a sub reference point set based on the k-th position of the k-th camera). In addition, $\overline{X}_k/d_m'$ of Formula 8 represents 3D coordinates on the k-th sub stereoscopic image that is projected onto the k-th sub virtual sphere in a k-th camera coordinate system set based on the k-th position.

Then, through $$M(\Theta_k^{-1})\begin{bmatrix} \overline{X}_k/d'_m \\ 1 \end{bmatrix}$$

of Formula 8, each of positions of each of the pixels on the k-th sub stereoscopic images may be converted to the k-th 3D pixel coordinates on the basis of the first main reference point.

Further, through $$\mathcal{J}_k(x, y, m) = C\left(M(\Theta_k^{-1})\begin{bmatrix} \overline{X}_k/d'_m \\ 1 \end{bmatrix}\right)$$

of Formula 8, the k-th 3D pixel coordinates may be applied to the final main 3D cost volume C to thereby obtain the k-th sub cost factor $$C(M(\Theta_k^{-1})\begin{bmatrix} \overline{X}_k/d'_m \\ 1 \end{bmatrix},$$

and the k-th sub cost volume $\mathcal{J}_k$ may be generated by using the k-th sub cost factor.

Herein, trilinear interpolation may be used to obtain integer indices of (θ, Ψ, n) corresponding to the k-th 3D pixel coordinates.

Next, the image processing device 1000 may generate one or more k-th sub inverse distance indices corresponding to one or more k-th sub inverse distances by using the k-th sub cost volume, wherein each of the k-th sub inverse distances represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point of the k-th camera and the M k-th sub virtual geometries. Then, the image processing device 1000 may acquire at least one sub separation distance among the (k_1)-st sub separation distance to the (k_M)-th sub separation distance by referring to the k-th sub inverse distances extracted from the k-th sub inverse distance indices.

Also, the image processing device 1000 may generate one or more main inverse distance indices corresponding to one or more main inverse distances by using the final main 3D cost volume, wherein each of the main inverse distances represents each of inverse values of each of N main separation distances, each of the N main separation distances meaning each of distances between the predetermined main reference point and the N main virtual geometries or between the predetermined main reference virtual geometry and the N main virtual geometries. Then, the image processing device 1000 may acquire at least one main separation distance among the N main separation distances by referring to the main inverse distances extracted from the main inverse distance indices.

As one example, when the main virtual geometries correspond to the main virtual spheres, the image processing device 1000 may generate one or more main inverse depth indices corresponding to one or more main inverse depths by using the final main 3D cost volume, wherein each of the main inverse depths represents each of inverse values of the (1_1)-st main separation distance to the (1_N)-th main separation distance, each of the (1_1)-st main separation distance to the (1_N)-th main separation distance meaning each of distances between the first main reference point and the N main virtual spheres. Then, the image processing device 1000 may acquire the at least one main separation distance among the (1_1)-st main separation distance to the (1_N)-th main separation distance by referring to the main inverse depths extracted from the main inverse depth indices.

As another example, when the main virtual geometries correspond to the main virtual rounded cuboids, the image processing device 1000 may generate one or more main inverse radius indices corresponding to one or more main inverse radii by using the final main 3D cost volume, wherein each of the main inverse radii represents each of inverse values of the (2_1)-st main separation distance to the (2_N)-th main separation distance of the N main virtual rounded cuboids. Then, the image processing device 1000 may acquire the at least one main separation distance among the (2_1)-st main separation distance to the (2_N)-th main separation distance by referring to the main inverse radii extracted from the main inverse radius indices.

Hereinafter, a method of the image processing device 1000 generating the main inverse distance indices and the main separation distances is described.

Herein, the image processing device 1000 may generate the main inverse radius indices, i.e., the main inverse depth indices or the main inverse radius indices, by normalizing the final main 3D cost volume according to the azimuth angle and the polar angle of the spherical coordinate system.

The main inverse depth indices or the main inverse radius indices n̂ may be calculated according to Formula 9 as shown below.

$$\hat{n}(\theta, \Psi) = \sum_{n=0}^{N-1} n \times \frac{e^{-C(\theta,\Psi,n)}}{\sum_{v} e^{-C(\theta,\Psi,v)}} \quad \langle \text{Formula 9} \rangle$$

Herein, $C$ is the final main 3D cost volume.

For example, given that "$n \in [0, 1, \ldots, N-1]$", a total of N main inverse distance indices exist in a specific direction ($\theta, \Psi$) (from the main reference point) in which a specific object is located. Among these N main inverse distance indices, a specific main inverse distance index corresponding to a distance to a specific main virtual geometry corresponding to a distance to a specific object may be obtained by the image processing device 1000 as follows.

For example, when the main virtual geometries correspond to the main virtual spheres and when the value of the main inverse depth index (i.e., an index corresponding to the distance to the specific object located in the specific direction ($\theta, \Psi$) from the first main reference point) generated by using the final main 3D cost volume according to Formula 9 above is 2, this corresponds to a third main virtual sphere among the N main virtual spheres, and thus a separation distance r2 between the third main virtual sphere and the first main reference point is acquired as the main separation distance. As another example, when the main virtual geometries correspond to the main virtual rounded cuboids and when the value of the main inverse radius index (i.e., an index corresponding to the distance to the specific object located in the specific direction ($\theta, \Psi$) from the second main reference point) generated by using the final main 3D cost volume according to Formula 9 above is 3, this corresponds to a fourth main virtual rounded cuboid among the N main virtual rounded cuboids, and thus a separation distance r3 between the fourth main virtual rounded cuboid and the main reference virtual geometry is acquired as the main separation distance.

For reference, the k-th sub inverse distance indices $\hat{m}_k$ of the k-th camera may be calculated according to Formula 10 as shown below. Since a method of generating the k-th sub inverse distance indices is similar to a method of generating the main inverse distance indices, repeated explanation thereof is omitted.

$$\hat{m}_k(x, y) = \sum_{m=0}^{M-1} \left( m \times \frac{e^{\mathcal{J}_k(x,y,m)}}{\sum_{v} e^{\mathcal{J}_k(x,y,v)}} \right) \quad \langle \text{Formula 10} \rangle$$

Herein, $\mathcal{J}_k$ is the k-th sub cost volume.

Following, the image processing device 1000 may acquire the distance from the moving body to at least one object by referring to (i) the at least one main separation distance among the (1_1)-st main separation distance to the (1_N)-th main separation distance and (ii) the at least one sub separation distance among the (k_1)-st sub separation distance to the (k_M)-th sub separation distance.

For reference, in the present disclosure, the meaning of obtaining the distance may mean (i) obtaining a main depth map indicating the distance from the main reference point to at least one object, and (ii) obtaining a sub depth map indicating the distance from the sub reference point to at least one object.

For example, if there is an object A located around the moving body, the image processing device 1000 may (i) (i–1) obtain a specific main inverse distance index corresponding to a direction in which the object A is located, and (i–2) derive a specific main separation distance from a specific main inverse distance extracted from the specific main inverse distance index, (ii) (ii–1) obtain at least one specific sub inverse distance index of at least one camera, and (ii–2) derive at least one specific sub separation distance from at least one specific sub inverse distance extracted from the specific sub inverse distance index, and thus (iii) acquire the distance to the object A by referring to the specific main separation distance and the at least one specific sub separation distance.

Meanwhile, in order to generate more accurate inverse distance indices, the image processing device 1000 may train at least part of the cost volume computation network and the sweep network.

For example, the image processing device 1000 may generate at least one sub distance loss by referring to the k-th sub inverse distance indices and their corresponding k-th ground truth sub inverse distance indices and thus train at least part of the cost volume computation network and the sweep network by using the sub distance loss through an end-to-end way.

In detail, the image processing device 1000 may acquire the sub distance loss by referring to the k-th ground truth sub inverse distance indices $m_k^*$ and the k-th sub inverse distance indices $\hat{m}_k$ according to Formula 11 below.

$$\sum_{k} L_{smooth_{L1}}(\hat{m}_k, m_k^*) \quad \langle \text{Formula 11} \rangle$$

As another example, the image processing device 1000 may generate at least one main distance loss by referring to the main inverse distance indices and their corresponding ground truth main inverse distance indices and thus train at least part of the cost volume computation network and the sweep network by additionally using the main distance loss through the end-to-end way according to Formula 12 below.

$$L = L_{smooth_{L1}}(\hat{n}, n^*) + \lambda \sum_{k} L_{smooth_{L1}}(\hat{m}_k, m_k^*) \quad \langle \text{Formula 12} \rangle$$

For reference, Formula 12 shows that a weight $\lambda$ is multiplied to the sub distance loss to adjust the degree to which the sub distance loss affects the training, but the present disclosure is not limited thereto.

For example, the weight $\lambda$ may be multiplied to the main distance loss alone, or may be multiplied to both the main distance loss and the sub distance loss. Also, in case weights are multiplied to both the main distance loss and the sub distance loss, the two weights may be set to be equal to or different from each other.

Thus, the problem of the conventional method described with reference to FIG. 1 is solved through the above-mentioned configuration, and more specifically, more accurate estimation of the distance may be made possible by assigning a heavier penalty in case the object B in FIG. 1 is estimated to be a true depth.

Meanwhile, hereinafter, processes of the image processing device 1000 (i) generating the distance information to the object and (ii) generating a k-th estimated segmentation result corresponding to the k-th image of the k-th camera in accordance with one example embodiment of the present disclosure are explained by referring to FIG. 12.

Figure 12:
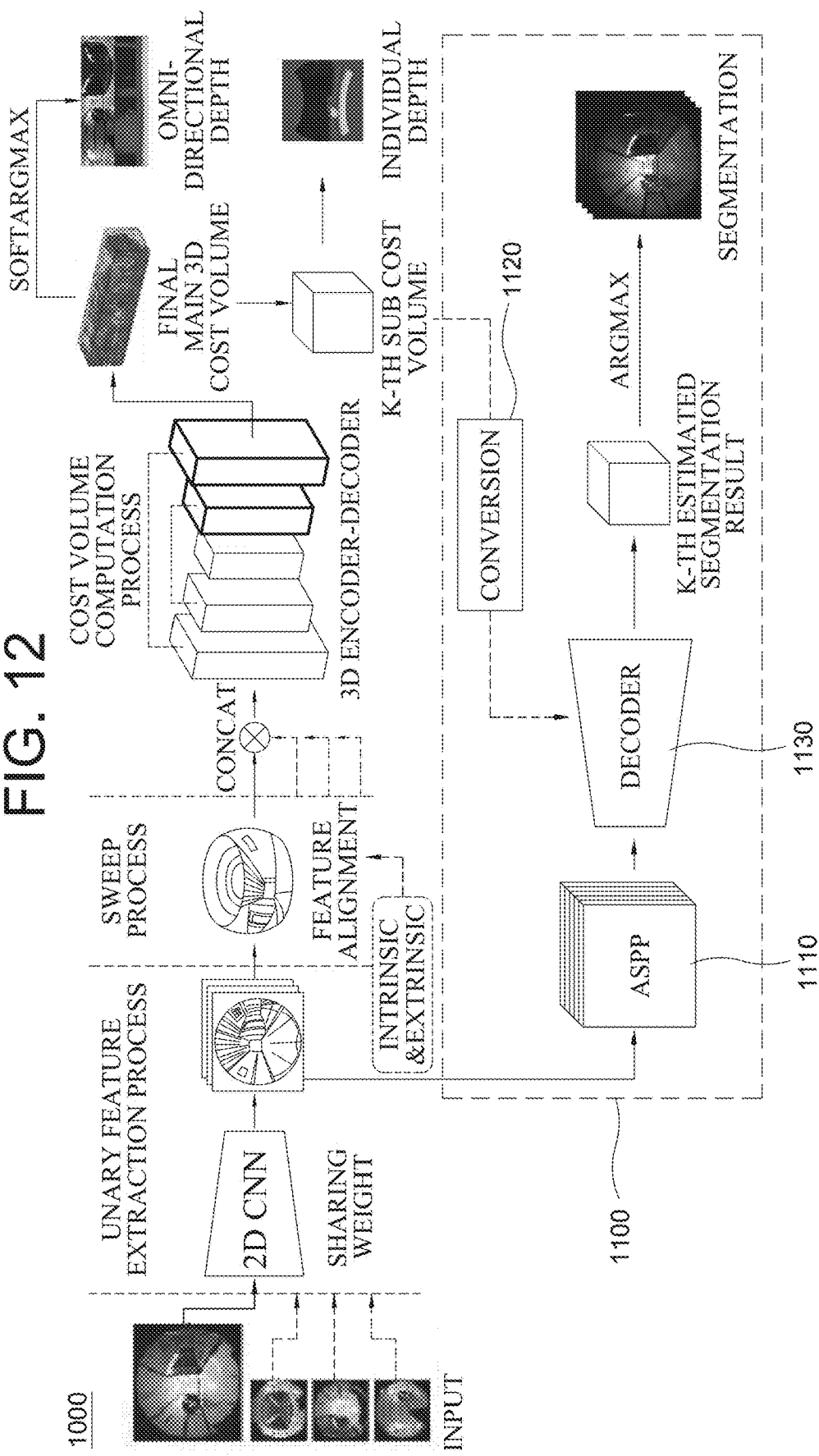
FIG. 12 is a drawing schematically illustrating processes of generating distance information on the object and generating a k-th estimated segmentation result corresponding to a k-th image of a k-th camera in accordance with one example embodiment of the present disclosure.

First, with regard to the process of generating the distance information to the object, the final main 3D cost volume (i.e., the probability (cost) volume in FIG. 12) may first be generated through a unary feature extraction process, a sweep process and a cost volume computation process, and then the distance to the object may be acquired by using the final main 3D cost volume and the k-th sub cost volume obtained from the final main 3D cost volume.

As an example, detailed structures of each of models performing the unary feature extraction process, the sweep process and the cost volume computation process are shown in Table 1 below.

TABLE 1

| | | | |
|---|---|---|---|
| unary feature extraction | Input | | $H_I \times W_I$ |
| | conv1 | 5 × 5, 32 | |
| | conv2 | 3 × 3, 32 | |
| | conv3 | 3 × 3, 32, add conv1 | |
| | conv4-11 | repeat conv 2-3 | $\frac{1}{2}H_I \times \frac{1}{2}W_I \times 32$ |
| | conv12-17 | repeat conv 2-3 with dilate = 2, 3, 4 | |
| sweeping | warp | 3 × 3 × 1, 32 | $H \times W \times \frac{1}{2}N \times 32$ |
| | transference | | $\frac{1}{2} \times \frac{1}{2} \times \frac{1}{2} \times 32$ |
| | concat(4)* | 3 × 3 × 3, 64 | $\frac{1}{2} \times \frac{1}{2} \times \frac{1}{2} \times 128$ |
| | fusion | | $\frac{1}{2} \times \frac{1}{2} \times \frac{1}{2} \times 64$ |
| cost volume computation | 3Dconv1-3 | 3 × 3 × 3, 64 | $\frac{1}{2} \times \frac{1}{2} \times \frac{1}{2} \times 64$ |
| | 3Dconv4-6 | 3 × 3 × 3, 128 | $\frac{1}{4} \times \frac{1}{4} \times \frac{1}{4} \times 128$ |
| | 3Dconv7-9 | 3 × 3 × 3, 128 | $\frac{1}{8} \times \frac{1}{8} \times \frac{1}{8} \times 128$ |
| | 3Dconv10-12 | 3 × 3 × 3, 128 | $\frac{1}{16} \times \frac{1}{16} \times \frac{1}{16} \times 128$ |
| | 3Dconv13-15 | 3 × 3 × 3, 256 | $\frac{1}{32} \times \frac{1}{32} \times \frac{1}{32} \times 256$ |
| | 3Ddeconv1 | 3 × 3 × 3, 128, add 3Dconv 12 | $\frac{1}{16} \times \frac{1}{16} \times \frac{1}{16} \times 128$ |
| | 3Ddeconv2 | 3 × 3 × 3, 128, add 3Dconv 9 | $\frac{1}{8} \times \frac{1}{8} \times \frac{1}{8} \times 128$ |
| | 3Ddeconv3 | 3 × 3 × 3, 128, add 3Dconv 6 | $\frac{1}{4} \times \frac{1}{4} \times \frac{1}{4} \times 128$ |
| | 3Ddeconv4 | 3 × 3 × 3, 64, add 3Dconv 3 | $\frac{1}{2} \times \frac{1}{2} \times \frac{1}{2} \times 64$ |
| | 3Ddeconv5 | 3 × 3 × 3, 1 | $H \times W \times N$ |

Also, the process of generating the k-th estimated segmentation result corresponding to the k-th image of the k-th camera is described below.

For reference, an accuracy of segmentation results may be improved by utilizing the distance information to the object.

Therefore, in order to improve the accuracy of the segmentation results, the image processing device 1000 in accordance with one example embodiment of the present disclosure may instruct a segmentation network 1100 to (i) obtain the feature maps from the 2D convolution layers for generating the distance information of the object and (ii) utilize a cost volume (i.e., the k-th sub cost volume) including the distance information of the object.

For example, a k-th feature map corresponding to the k-th image may be acquired from a specific 2D convolution layer among the plurality of 2D convolution layers (i.e., 2D CNN of the unary feature extraction process in FIG. 12).

Herein, the specific 2D convolution layer may be the last convolution layer of the plurality of 2D convolution layers, but the present disclosure is not limited thereto, and the specific 2D convolution layer may also be any intermediate convolution layers among the plurality of 2D convolution layers.

Next, the image processing device 1000 may input the k-th feature map and the k-th sub cost volume to the segmentation network 1100 including 2D deconvolution layers, to thereby instruct the segmentation network to generate the k-th estimated segmentation result corresponding to the k-th image through the 2D deconvolution layers 1130.

Herein, the segmentation network 1100 may include Atrous Spatial Pyramid Pooling (ASPP) layers 1110 and a conversion module 1120.

In detail, the image processing device 1000 may instruct the segmentation network 1100 to (i) apply Astrous Convolution operation and Spatial Pyramid Pooling operation to the k-th feature map through the ASPP layer 1110 to thereby generate a first intermediate output, (ii) convert the k-th sub cost volume (i.e., resampled prob. volume in FIG. 12) through the conversion module 1120 to generate a second intermediate output, and (iii) generate the k-th estimated segmentation result corresponding to the k-th image through the 2D deconvolution layers 1130 by using the first intermediate output and the second intermediate output.

Herein, the conversion module 1120 may be a module for converting the k-th sub cost volume into the second intermediate output according to the number of channels of the first intermediate output.

Also, the second intermediate output converted from the k-th sub cost volume may be inputted to the first deconvolution layer of the plurality of the 2D deconvolution layers 1130, but the present disclosure is not limited thereto, and instead may be inputted to any of intermediate deconvolution layers among the plurality of the 2D deconvolution layers 1130.

Following, the image processing device 1000 may (i) generate at least one sub distance loss by referring to the k-th sub inverse distance indices and their corresponding k-th ground truth sub inverse distance indices and thus train at least part of the cost volume computation network and the sweep network by using the sub distance loss through the end-to-end way, and (ii) generate at least one segmentation loss by referring to the k-th estimated segmentation result $\hat{S}_k$ and its corresponding k-th ground truth segmentation result $S_k^*$ and thus train the segmentation network by using the segmentation loss through the end-to-end way.

$$L = (1-\lambda)\sum_k L_{CE}(\hat{S}_k, S_k^*) + \lambda \sum_k L_{smooth_{L1}}(\hat{m}_k, m_k^*) \quad \langle\text{Formula 13}\rangle$$

For reference, similar to the previously described main distance loss and the sub distance loss, a weight (e.g., 1−λ) may be multiplied to the segmentation loss to adjust the degree to which the segmentation loss affects the training.

As another example, the image processing device 1000 may (i) train at least part of the cost volume computation network and the sweep network through the end-to-end way by using the main distance loss and the sub distance loss, and (ii) train the segmentation network through the end-to-end way by using at least one segmentation loss.

As described above, the image processing device 1000 in accordance with one example embodiment of the present disclosure is possible to acquire the distance from the moving body to at least one object located in any direction of the moving body by using only a small number of cameras. Also, it is possible to effectively estimate corresponding image pairs among the cameras since the image processing device 1000 is able to correct the distortions of the plurality of cameras by using lens distortion parameters and the geometric relationship among the cameras at the same time. In addition, the image processing device 1000 is able to compensate for errors in imaging directions of the cameras in real time, thereby preventing performance degradation. Also, as the sampling of various distance candidates becomes flexible, the distance to the object can be easily obtained even if the number of cameras is changed. Additionally, the image processing device 1000 is able to estimate the distance to the object more accurately and obtain a high-resolution depth map for each camera as a result of training at least part of the 2D convolution layers, the cost volume computation network and the sweep network by using the sub distance loss for each camera. Further, the image processing device 1000 outputs more accurate segmentation results by using the distance information obtained as described above. Similarly, it is also possible for the image processing device 1000 to obtain more accurate depth map for each camera by using the segmentation results.

Adding to this, in response to acquiring a first image generated by a first camera, the image processing device 1000 may obtain not only a depth map corresponding to the first image for a first lens of the first camera, but also a depth map corresponding to the first image for a second lens model of a second camera, to thereby construct a surrounding map useful for a visual positioning system.

In other words, not only generating the sub cost volume and the distance information corresponding to the lens (e.g., a fisheye lens) used for actual imaging, it is also possible for the image processing device 1000 to generate a sub cost volume and distance information corresponding to a virtual lens (e.g., a standard pinhole lens) that is not used for the actual imaging.

The present disclosure has an effect of acquiring the distance of the moving body to at least one object located in any direction of the moving body.

The present disclosure has another effect of generating a sub cost volume for each of cameras by using a main cost volume obtained from a plurality of images captured by the cameras and acquiring the distance to at least one object from the moving body by using the sub cost volume for each of the cameras.

The present disclosure has still another effect of improving accuracy of segmentation results by using distance information on the object.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for acquiring a distance from a moving body to at least one object located in any direction of the moving body, comprising steps of:
   (a) acquiring, at an image processing device, a 1-st image to a p-th image generated by a 1-st camera to a p-th camera, spaced apart from one another on the moving body and capable of covering all directions of the moving body by using each of their respective Field of Views (FOVs), and inputting, by the image processing device, the 1-st image to the p-th image to a sweep network and instructing the sweep network to (i) project a plurality of pixels on each of the 1-st image to the p-th image onto N main virtual geometries, respectively formed on a basis of a predetermined main reference point or a predetermined main reference virtual geometry, to thereby generate a plurality of main stereoscopic images, and (ii) apply three-dimensional (3D) concatenation operation to the plurality of the main stereoscopic images and thus generate an initial four-dimensional (4D) cost volume;

(b) inputting, by the image processing device, the initial 4D cost volume to a cost volume computation network, including a plurality of 3D convolution layers and their corresponding 3D deconvolution layers, to thereby generate a final main 3D cost volume; and (c) performing, by the image processing device, (i) processes of (i–1) projecting a plurality of pixels on a k-th image, generated from a k-th camera among the 1-st camera to the p-th camera, onto M k-th sub virtual geometries, respectively formed on a basis of a predetermined k-th sub reference point, to thereby generate a plurality of k-th sub stereoscopic images, (i–2) converting each of positions of each of a plurality of pixels on the plurality of the k-th sub stereoscopic images on the basis of the predetermined main reference point, to thereby acquire k-th 3D pixel coordinates, (i–3) applying the k-th 3D pixel coordinates to the final main 3D cost volume to thereby acquire a k-th sub cost factor, (i–4) generating a k-th sub cost volume by using the k-th sub cost factor, (i–5) generating one or more k-th sub inverse distance indices corresponding to one or more k-th sub inverse distances by using the k-th sub cost volume, wherein each of the k-th sub inverse distances represents each of inverse values of each of a (k_1)-st sub separation distance to a (k_M)-th sub separation distance, each of the (k_1)-st sub separation distance to the (k_M)-th sub separation distance meaning each of distances between the predetermined k-th sub reference point of the k-th camera and the M k-th sub virtual geometries, and (i–6) acquiring at least one sub separation distance among the (k_1)-st sub separation distance to the (k_M)-th sub separation distance by referring to the k-th sub inverse distances extracted from the k-th sub inverse distance indices, and (ii) processes of (ii–1) generating one or more main inverse distance indices corresponding to one or more main inverse distances by using the final main 3D cost volume, wherein each of the main inverse distances represents each of inverse values of each of N main separation distances, each of the N main separation distances meaning each of distances between the predetermined main reference point and the N main virtual geometries or between the predetermined main reference virtual geometry and the N main virtual geometries, (ii–2) acquiring at least one main separation distance among the N main separation distances by referring to the main inverse distances extracted from the main inverse distance indices, and thus (ii–3) acquiring a distance from the moving body to at least one object located in any direction of the moving body by referring to the at least one sub separation distance among the (k_1)-st sub separation distance to the (k_M)-th sub separation distance and the at least one main separation distance among the N main separation distances.

2. The method of claim 1, wherein the N main virtual geometries are centered on a first main reference point which is the predetermined main reference point set by referring to a 1-st position of the 1-st camera to a p-th position of the p-th camera, and wherein the N main virtual geometries correspond to N main virtual spheres whose radii are the N main separation distances comprised of a (1_1)-st main separation distance to a (1_N)-th main separation distance, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the step of (c), the image processing device performs processes of (i) (i–1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i–2) acquiring the at least one sub separation distance among the (k_1)-st sub separation distance to the (k_M)-th sub separation distance by referring to the k-th sub inverse depths extracted from the k-th sub inverse depth indices, and (ii) (ii–1) generating one or more main inverse depth indices corresponding to one or more main inverse depths by using the final main 3D cost volume, wherein each of the main inverse depths represents each of inverse values of the (1_1)-st main separation distance to the (1_N)-th main separation distance, each of the (1_1)-st main separation distance to the (1_N)-th main separation distance meaning each of distances between the first main reference point and the N main virtual spheres, (ii–2) acquiring the at least one main separation distance among the (1_1)-st main separation distance to the (1_N)-th main separation distance by referring to the main inverse depths extracted from the main inverse depth indices, and thus (ii–3) acquiring the distance from the moving body to at least one object located in any direction of the moving body by referring to the at least one main separation distance among the (1_1)-st main separation distance to the (1_N)-th main separation distance and the at least one sub separation distance among the (k_1)-st sub separation distance to the (k_M)-th sub separation distance.

3. The method of claim 1, wherein the N main virtual geometries correspond to N main virtual rounded cuboids each of which includes a main extended plane set, having three main extended planes, and main curved surfaces interconnecting at least two of the three main extended planes, wherein the three main extended planes are respectively formed at a (2_1)-st main separation distance to a (2_N)-th main separation distance from each of three main reference planes of the main reference virtual geometry that is centered on a second main reference point set as the predetermined main reference point by referring to a 1-st position of the 1-st camera to a p-th position of the p-th camera, wherein the three main reference planes are orthogonal to one another, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the step of (c), the image processing device performs processes of (i) (i-1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i-2) acquiring the at least one sub separation distance among the (k_1)-st sub separation distance to the (k_M)-th sub separation distance by referring to the k-th sub inverse depths extracted from the k-th sub inverse depth indices, and (ii) (ii-1) generating one or more main inverse radius indices corresponding to one or more main inverse radii by using the final main 3D cost volume, wherein each of the main inverse radii represents each of inverse values of the (2_1)-st main separation distance to the (2_N)-th main separation distance of the N main virtual rounded cuboids, (ii-2) acquiring the at least one main separation distance among the (2_1)-st main separation distance to the (2_N)-th main separation distance by referring to the main inverse radii extracted from the main inverse radius indices, and thus (ii-3) acquiring the distance from the moving body to at least one object located in any direction of the moving body by referring to the at least one main separation distance among the (2_1)-st main separation distance to the (2_N)-th main separation distance and the at least one sub separation distance among the (k_1)-st sub separation distance to the (k_M)-th sub separation distance.

4. The method of claim 3, wherein, at the step of (a), the image processing device instructs the sweep network to (i) compute a specific distance di equivalent to a distance between the second main reference point of the main reference virtual geometry and a specific point on an i-th main virtual rounded cuboid, wherein i is an integer bigger than or equal to 1 and smaller than or equal to N, and (ii) project the plurality of pixels on each of the 1-st image to the p-th image onto the i-th main virtual rounded cuboid by referring to the specific distance di, wherein the specific distance di is determined by an equation:

$$di = f(ri, \theta, \Psi; w, h, l)$$

wherein (i) ri is a separation distance between the main reference virtual geometry and the i-th main virtual rounded cuboid, (ii) θ and Ψ are respectively an azimuth angle and a polar angle of a virtual line segment connecting the specific point and the second main reference point of the main reference virtual geometry in a spherical coordinate system having the second main reference point as an origin thereof, and (iii) w, h and l are respectively lengths of a first edge, a second edge and a third edge of the main reference virtual geometry which are orthogonal to one another.

5. The method of claim 1, further comprising a step of:
(d) the image processing device generating at least one sub distance loss by referring to the k-th sub inverse distance indices and their corresponding k-th ground truth sub inverse distance indices and thus training at least part of the cost volume computation network and the sweep network by using the sub distance loss through an end-to-end way.

6. The method of claim 5, at the step of (d), additionally generating, by the image processing device, at least one main distance loss by referring to the main inverse distance indices and their corresponding ground truth main inverse distance indices and thus training, by the image processing device, at least part of the cost volume computation network and the sweep network by additionally using the main distance loss through the end-to-end way.

7. The method of claim 1, at the step of (a), receiving, by the image processing device, the 1-st image to the p-th image from the 1-st camera to the p-th camera, and generating, by the image processing device, a 1-st feature map to a p-th feature map corresponding to the 1-st image to the p-th image by inputting the 1-st image to the p-th image to a plurality of 2D (two-dimensional) convolution layers, and thus generating, by the image processing device, the main stereoscopic images from the 1-st feature map to the p-th feature map.

8. The method of claim 7, further comprising a step of:
(e) acquiring, at the image processing device, a k-th feature map corresponding to the k-th image from a specific 2D convolution layer among the plurality of 2D convolution layers, and inputting, by the image processing device, the k-th feature map and the k-th sub cost volume to a segmentation network including 2D deconvolution layers, to thereby instruct the segmentation network to generate a k-th estimated segmentation result corresponding to the k-th image through the 2D deconvolution layers.

9. The method of claim 8, further comprising a step of:
(f) the image processing device (i) generating at least one sub distance loss by referring to the k-th sub inverse distance indices and their corresponding k-th ground truth sub inverse distance indices and thus training at least part of the cost volume computation network and the sweep network by using the sub distance loss through an end-to-end way, and (ii) generating at least one segmentation loss by referring to the k-th estimated segmentation result and its corresponding k-th ground truth segmentation result and thus training the segmentation network by using the segmentation loss through the end-to-end way.

10. The method of claim 9, at the step of (f), additionally generating, by the image processing device, at least one main distance loss by referring to the main inverse distance indices and their corresponding ground truth main inverse distance indices and thus training, by the image processing device, at least part of the cost volume computation network and the sweep network by additionally using the main distance loss through the end-to-end way.

11. An image processing device for acquiring a distance from a moving body to at least one object located in any direction of the moving body, comprising:
at least one memory that stores instructions; and
at least one processor configured to execute the instructions to perform or support another device to perform: (I) on condition that a 1-st camera to a p-th camera, capable of covering all directions of the moving body by using each of their respective Field of Views (FOVs), have been arranged to be apart from one another on the moving body, in response to acquiring a 1-st image to a p-th image generated by the 1-st camera to the p-th camera, a process of inputting the 1-st image to the p-th image to a sweep network and instructing the sweep network to (i) project a plurality of pixels on each of the 1-st image to the p-th image onto N main virtual geometries, respectively formed on a basis of a predetermined main reference point or a predetermined main reference virtual geometry, to thereby generate a plurality of main stereoscopic images, and (ii) apply three-dimensional (3D) concatenation operation to the plurality of the main stereoscopic images and thus generate an initial four-dimensional (4D) cost volume; (II) a process of inputting the initial 4D cost volume to a cost volume computation network, including a plurality of 3D convolution layers and their corresponding 3D deconvolution layers, to thereby generate a final main 3D cost volume; and (III) (i) processes of (i–1) projecting a plurality of pixels on a k-th image, generated from a k-th camera among the 1-st camera to the p-th camera, onto M k-th sub virtual geometries, respectively formed on a basis of a predetermined k-th sub reference point, to thereby generate a plurality of k-th sub stereoscopic images, (i–2) converting each of positions of each of a plurality of pixels on the plurality of the k-th sub stereoscopic images on the basis of the predetermined main reference point, to thereby acquire k-th 3D pixel coordinates, (i–3) applying the k-th 3D pixel coordinates to the final main 3D cost volume to thereby acquire a k-th sub cost factor, (i–4) generating a k-th sub cost volume by using the k-th sub cost factor, (i–5) generating one or more k-th sub inverse distance indices corresponding to one or more k-th sub inverse distances by using the k-th sub cost volume, wherein each of the k-th sub inverse distances represents each of inverse values of each of a (k_1)-st sub separation distance to a (k_M)-th sub separation distance, each of the (k_1)-st sub separation distance to the (k_M)-th sub separation distance meaning each of distances between the predetermined k-th sub reference point of the k-th camera and the M k-th sub virtual geometries, and (i–6) acquiring at least one sub separation distance among the (k_1)-st sub separation distance to the (k_M)-th sub separation distance by referring to the k-th sub inverse distances extracted from the k-th sub inverse distance indices, and (ii) processes of (ii–1) generating one or more main inverse distance indices corresponding to one or more main inverse distances by using the final main 3D cost volume, wherein each of the main inverse distances represents each of inverse values of each of N main separation distances, each of the N main separation distances meaning each of distances between the predetermined main reference point and the N main virtual geometries or between the predetermined main reference virtual geometry and the N main virtual geometries, (ii–2) acquiring at least one main separation distance among the N main separation distances by referring to the main inverse distances extracted from the main inverse distance indices, and thus (ii–3) acquiring a distance from the moving body to at least one object located in any direction of the moving body by referring to the at least one sub separation distance among the (k_1)-st sub separation distance to the (k_M)-th sub separation distance and the at least one main separation distance among the N main separation distances.

12. The device of claim 11, wherein the N main virtual geometries are centered on a first main reference point which is the predetermined main reference point set by referring to a 1-st position of the 1-st camera to a p-th position of the p-th camera, and wherein the N main virtual geometries correspond to N main virtual spheres whose radii are the N main separation distances comprised of a (1_1)-st main separation distance to a (1_N)-th main separation distance, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the processes of (III), the processor performs processes of (i) (i–1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i–2) acquiring the at least one sub separation distance among the (k_1)-st sub separation distance to the (k_M)-th sub separation distance by referring to the k-th sub inverse depths extracted from the k-th sub inverse depth indices, and (ii) (ii–1) generating one or more main inverse depth indices corresponding to one or more main inverse depths by using the final main 3D cost volume, wherein each of the main inverse depths represents each of inverse values of the (1_1)-st main separation distance to the (1_N)-th main separation distance, each of the (1_1)-st main separation distance to the (1_N)-th main separation distance meaning each of distances between the first main reference point and the N main virtual spheres, (ii–2) acquiring the at least one main separation distance among the (1_1)-st main separation distance to the (1_N)-th main separation distance by referring to the main inverse depths extracted from the main inverse depth indices, and thus (ii–3) acquiring the distance from the moving body to at least one object located in any direction of the moving body by referring to the at least one main separation distance among the (1_1)-st main separation distance to the (1_N)-th main separation distance and the at least one sub separation distance among the (k_1)-st sub separation distance to the (k_M)-th sub separation distance.

13. The device of claim 11, wherein the N main virtual geometries correspond to N main virtual rounded cuboids each of which includes a main extended plane set, having three main extended planes, and main curved surfaces interconnecting at least two of the three main extended planes, wherein the three main extended planes are respectively formed at a (2_1)-st main separation distance to a (2_N)-th main separation distance from each of three main reference planes of the main reference virtual geometry that is centered on a second main reference point set as the predetermined main reference point by referring to a 1-st position of the 1-st camera to a p-th position of the p-th camera, wherein the three main reference planes are orthogonal to one another, wherein the M k-th sub virtual geometries are centered on the predetermined k-th sub reference point set by referring to a k-th position of the k-th camera, and wherein the M k-th sub virtual geometries correspond to M k-th sub virtual spheres whose radii are the (k_1)-st sub separation distance to the (k_M)-th sub separation distance, and wherein, at the processes of (III), the processor performs processes of (i) (i–1) generating one or more k-th sub inverse depth indices corresponding to one or more k-th sub inverse depths by using the k-th sub cost volume, wherein each of the k-th sub inverse depths represents each of inverse values of each of the (k_1)-st sub separation distance to the (k_M)-th sub separation distance, each of the (k_1)-st sub separation distance to the (k_M)-th sub separation distance meaning each of distances between the predetermined k-th sub reference point and the M k-th sub virtual geometries, (i–2) acquiring the at least one sub separation distance among the (k_1)-st sub separation distance to the (k_M)-th sub separation distance by referring to the k-th sub inverse depths extracted from the k-th sub inverse depth indices, and (ii) (ii–1) generating one or more main inverse radius indices corresponding to one or more main inverse radii by using the final main 3D cost volume, wherein each of the main inverse radii represents each of inverse values of the (2_1)-st main separation distance to the (2_N)-th main separation distance of the N main virtual rounded cuboids, (ii–2) acquiring the at least one main separation distance among the (2_1)-st main separation distance to the (2_N)-th main separation distance by referring to the main inverse radii extracted from the main inverse radius indices, and thus (ii–3) acquiring the distance from the moving body to at least one object located in any direction of the moving body by referring to the at least one main separation distance among the (2_1)-st main separation distance to the (2_N)-th main separation distance and the at least one sub separation distance among the (k_1)-st sub separation distance to the (k_M)-th sub separation distance.

14. The device of claim 13, wherein, at the process of (I), the processor instructs the sweep network to (i) compute a specific distance di equivalent to a distance between the second main reference point of the main reference virtual geometry and a specific point on an i-th main virtual rounded cuboid, wherein i is an integer bigger than or equal to 1 and smaller than or equal to N, and (ii) project the plurality of pixels on each of the 1-st image to the p-th image onto the i-th main virtual rounded cuboid by referring to the specific distance di, wherein the specific distance di is determined by an equation:

$$di = f(ri, \theta, \Psi; w, h, l)$$

wherein (i) ri is a separation distance between the main reference virtual geometry and the i-th main virtual rounded cuboid, (ii) θ and Ψ are respectively an azimuth angle and a polar angle of a virtual line segment connecting the specific point and the second main reference point of the main reference virtual geometry in a spherical coordinate system having the second main reference point as an origin thereof, and (iii) w, h and l are respectively lengths of a first edge, a second edge and a third edge of the main reference virtual geometry which are orthogonal to one another.

15. The device of claim 11, wherein the processor further performs a process of:
(IV) generating at least one sub distance loss by referring to the k-th sub inverse distance indices and their corresponding k-th ground truth sub inverse distance indices and thus training at least part of the cost volume computation network and the sweep network by using the sub distance loss through an end-to-end way.

16. The device of claim 15, wherein the processor additionally generates at least one main distance loss by referring to the main inverse distance indices and their corresponding ground truth main inverse distance indices and thus trains at least part of the cost volume computation network and the sweep network by additionally using the main distance loss through the end-to-end way.

17. The device of claim 11, wherein, at the process of (I), in response to receiving the 1-st image to the p-th image from the 1-st camera to the p-th camera, the processor generates a 1-st feature map to a p-th feature map corresponding to the 1-st image to the p-th image by inputting the 1-st image to the p-th image to a plurality of 2D (two-dimensional) convolution layers, and thus generates main stereoscopic images from the 1-st feature map to the p-th feature map.

18. The device of claim 17, wherein the processor further performs a process of:
(V) in response to acquiring a k-th feature map corresponding to the k-th image from a specific 2D convolution layer among the plurality of 2D convolution layers, inputting the k-th feature map and the k-th sub cost volume to a segmentation network including 2D deconvolution layers, to thereby instruct the segmentation network to generate a k-th estimated segmentation result corresponding to the k-th image through the 2D deconvolution layers.

19. The device of claim 18, wherein the processor further performs a process of:
(VI) (i) generating at least one sub distance loss by referring to the k-th sub inverse distance indices and their corresponding k-th ground truth sub inverse distance indices and thus training at least part of the cost volume computation network and the sweep network by using the sub distance loss through an end-to-end way, and (ii) generating at least one segmentation loss by referring to the k-th estimated segmentation result and its corresponding k-th ground truth segmentation result and thus training the segmentation network by using the segmentation loss through the end-to-end way.

20. The device of claim 19, wherein, at the process of (VI), the processor additionally generates at least one main distance loss by referring to the main inverse distance indices and their corresponding ground truth main inverse distance indices and thus trains at least part of the cost volume computation network and the sweep network by additionally using the main distance loss through the end-to-end way.

* * * * *